US006961166B2

(12) United States Patent
Wooten et al.

(10) Patent No.: US 6,961,166 B2
(45) Date of Patent: Nov. 1, 2005

(54) OPTICAL DIGITAL EXTERNAL MODULATOR

(75) Inventors: Ed Wooten, Windsor, CT (US); Karl Kissa, West Simsbury, CT (US); Gregory J. McBrien, Glastonbury, CT (US); Timothy C. Munks, North Granby, CT (US); Andrew Finch, Avon, CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/852,704

(22) Filed: May 24, 2004

(65) Prior Publication Data

US 2004/0240765 A1 Dec. 2, 2004

Related U.S. Application Data

(60) Provisional application No. 60/474,771, filed on May 30, 2003.

(51) Int. Cl.[7] ............................. G02F 1/03; G02F 1/00; G02F 1/01; G02F 1/035; H04B 10/04
(52) U.S. Cl. ....................... 359/245; 359/237; 359/279; 385/2; 385/3; 385/14; 398/98; 398/182; 398/188; 356/345
(58) Field of Search ................................ 359/237, 238, 359/239, 241, 279; 385/2, 3, 1, 8, 14, 15; 356/345; 398/98, 182, 188; 324/96; 341/137

(56) References Cited

U.S. PATENT DOCUMENTS

| 4,505,587 | A |   | 3/1985 | Haus et al. .................. 356/345 |
| 5,101,450 | A | * | 3/1992 | Olshansky ....................... 385/3 |
| 5,148,503 | A |   | 9/1992 | Skeie ............................. 385/3 |
| 5,161,044 | A |   | 11/1992 | Nazarathy et al. .......... 359/157 |
| 5,168,534 | A |   | 12/1992 | McBrien et al. ............... 385/3 |
| 5,249,243 | A |   | 9/1993 | Skeie ............................. 385/3 |
| 5,835,212 | A |   | 11/1998 | Kissa et al. .................. 356/345 |
| 5,886,807 | A |   | 3/1999 | Cummings .................... 359/263 |
| 5,956,171 | A | * | 9/1999 | Dennis et al. ............... 359/281 |
| 6,016,198 | A |   | 1/2000 | Burns et al. ................. 356/345 |
| 6,091,864 | A |   | 7/2000 | Hofmeister ..................... 385/2 |
| 6,304,685 | B1 |  | 10/2001 | Burns ............................. 385/3 |
| 6,341,184 | B1 |  | 1/2002 | Ho et al. ........................ 385/3 |
| 6,522,793 | B1 | * | 2/2003 | Szilagyi et al. ................ 385/2 |
| 6,535,320 | B1 |  | 3/2003 | Burns ............................. 385/3 |
| 6,580,840 | B1 | * | 6/2003 | McBrien et al. ............... 385/2 |
| 6,583,917 | B2 |  | 6/2003 | Melloni et al. ............. 359/245 |
| 6,647,158 | B2 |  | 11/2003 | Betts et al. ..................... 385/2 |

(Continued)

FOREIGN PATENT DOCUMENTS

EP           0 496 298 A2     7/1992         H04B/10/04

OTHER PUBLICATIONS

W. K. Burns et. al., "Broad-band reflection traveling-wave LiNbO3 modulator," IEEE Photonics Technology Letters, vol. 10, pp. 805–806, 1998.

(Continued)

*Primary Examiner*—Loha Ben
(74) *Attorney, Agent, or Firm*—Allen, Dyer, Doppelt, Milbrath & Gilchrist, P.A.

(57) ABSTRACT

An optical digital external modulator having a cascaded arrangement of interferometers is provided. The optical modulator includes an electrode structure for applying an electric field to each interferometer in the cascade and biasing circuitry coupled to the electrode structure for biasing each interferometer at a predetermined bias point. In particular, each predetermined bias point is selected to be above quadrature and for providing improved transmission performance of digital data signals. Preferably, the modulator has a reflective design that helps to increase the modulation bandwidth, lower the drive voltage, and reduce size.

36 Claims, 20 Drawing Sheets

U.S. PATENT DOCUMENTS

| | | | |
|---|---|---|---|
| 6,687,451 B1 | 2/2004 | Sikora | 385/187 |
| 6,721,081 B1 * | 4/2004 | Mauro et al. | 359/279 |
| 6,781,741 B2 * | 8/2004 | Uesaka | 359/279 |
| 6,785,434 B2 * | 8/2004 | Castoldi et al. | 385/14 |
| 2003/0175036 A1 * | 9/2003 | Mamyshev et al. | 398/188 |
| 2003/0175037 A1 | 9/2003 | Kimmitt et al. | 398/198 |
| 2003/0228107 A1 | 12/2003 | Howerton et al. | 385/47 |

OTHER PUBLICATIONS

W. K. Burns et. al., "Broad–band Unamplified optical link with RF gain using a LiNbO3 modulator," IEEE Photonics Technology Letters, vol. 11, pp. 1656–1658, 1999.

G. E. Betts, et al., "Microwave analog optical links using suboctave linearized modulators," IEEE Photonics Technology–Letters, vol. 8, pp. 1273–1275, 1996.

G. E. Betts, et al., "Optical analog link using linearized modulator," Proceedings of the Annual Meeting of the IEEE Laser and Electro–optic Society, paper IO4.3, pp. 278–279, 1994.

D. J. M. Sabido, et al., "Improving the dynamic range of a coherent analog optical link using a cascaded linearized modulator," IEEE Photonics Technology Letters, vol. 7, pp. 813–815, 1995.

V. Kaman, et al., et al., "Integrated tandem traveling–wave electroabsorption modulators for >100 Gbit/s OTDM applications," IEEE Photonives TEchnology Letters, vol. 7, pp. 813–815, 1995.

B. Mason, et al., "40–Gb/s tandem electroabsorption modulator," IEEE Photonics Technology Letters, vol. 14, pp. 27–29, 2002.

J. C. Cartledge, "Optimum operating points for electroabsorption modulators in 10 Gb/s transmission systems using nondispersion shifted fiber," IEEE Journal of Lightwave Technology, vol. 16, pp. 349–357, 1998.

D. Penninckx, et al., "Simple method to find optimum operatingpoint of an integrated laser modulator for a propagation over a standard dispersive fibre," Proceedings of the 22nd European Conference on Optical Communications, paper TuP.21, pp. 301–304, 1996.

W.K. Burns, "Linearized Optical Modulator with Fifth Order Correction," IEEE Journal of Lightwave Technology, vol. 13, pp. 1724–1727, 1995.

Wooten et al., "A Review of Lithium Niobate Modulators for Fibre–Optic Communications Systems," IEEE Journal of Selected Topics om Quantum Electronics, vol. 6, No. 1, pp. 69–82 Jan./Feb. 2000.

M.M. Howerton et al., "Subvolt Broadband Lithium Niobate Modulators", NRL review, 2002, Optical Sciences.

* cited by examiner

OPTICAL DIGITAL EXTERNAL MODULATOR

CROSS-REFERENCE TO RELATED APPLICATIONS

This application claims the benefit of U.S. Provisional Application No. 60/474,771, filed May 30, 2003, entitled "Improved Optical Digital External Modulator Using A Series Cascaded Arrangement And Biasing Means" which is incorporated herein by reference for all purposes.

MICROFICHE APPENDIX

Not Applicable.

TECHNICAL FIELD

The present application relates generally to optical modulators, and in particular, to optical digital external modulators.

BACKGROUND OF THE INVENTION

Optical modulators are currently used in optical communication systems to convert electrical signals representing data or voice into modulated optical signals. Optical modulators are typically based on direct or external modulation. With direct modulation, the optical source is turned on and off at intervals. With external modulation, the optical source is operated continuously and its output light is modulated using an optical external modulator.

Optical external modulators are superior to direct modulation in many ways. For example, optical external modulators are suitable for many high-speed applications and do not typically affect the wavelengths carrying the data signal as much as direct modulation. Furthermore, optical external modulators are often based on electro-optic, magneto-optic, acousto-optic, and/or electric field absorption type effects, thus providing additional design flexibility.

One example of a particularly successful optical external modulator is a Mach-Zehnder optical modulator, which is illustrated schematically in FIG. 1. The Mach-Zehnder optical modulator 10 includes an optical waveguide 20 formed on an electro-optic substrate 30, which for exemplary purposes is lithium niobate ($LiNbO_3$). The optical waveguide 20 includes a first Y-branch 22, a first interferometer arm 24, a second interferometer arm 26, and a second Y-branch 28. A traveling-wave electrode structure 40 is provided near/adjacent the optical waveguide 20. The exact position and design of the electrode structure 40 relative to the optical waveguide 20 is typically dependent on the crystal axis of the lithium niobate substrate 30. For example, when the lithium niobate substrate 30 is x-cut, as shown in FIG. 1, the electrode structure 40 is positioned such that the first interferometer arm 24 is disposed between ground electrode 42 and hot electrode 46, while the second interferometer arm 26 is disposed between ground electrode 44 and hot electrode 46.

In operation, light is input into the modulator 10 from the left side and is output on the right. More specifically, the input light propagates through the optical waveguide 20 until it is split at the first Y-branch 22, where it then propagates equally along the two isolated paths corresponding to the two interferometer arms 24, 26. When a time varying voltage is applied to the traveling-wave electrode structure 40, an electric field is produced that propagates down the electrode structure 40, which is constructed to form a microwave waveguide. The electric field at least partially overlaps the two interferometer arms 24 and 26. In accordance with the electro-optic effect, the electric field causes the relative velocity of the light propagating through the two interferometer arms to change, thus creating a phase shift and producing constructive or destructive interference at the second Y-branch 28. The constructive and/or destructive interference produces an amplitude modulated optical signal, wherein the modulation corresponds to a modulated RF data signal used to produce the time varying voltage.

FIG. 2a illustrates a transfer function of the electrical to optical conversion for a typical Mach-Zehnder optical modulator, such as that shown in FIG. 1. The transfer function is a theoretically sinusoidal curve that represents the points at which the optical modulator will transition from no output to maximum output. For example, when the applied voltage is near a first value $-V_\pi/2$ the modulator output is at a minimum. As the applied voltage approaches 0 the modulator output approaches 50% transmission. When the applied voltage is near a second value $V_\pi/2$, the modulator output is at a maximum. The value $V_\pi$ is known as the "peak-to-peak" or "switching" voltage. The point A, which is approximately half way between the maximum and minimum peaks of the transfer function, is known as a quadrature point. To achieve maximum modulation efficiency, it is usually preferred that the time varying voltage (i.e., an AC type voltage) includes a maximum amplitude of $V_\pi$ and that the optical modulator be biased at quadrature (i.e., a DC bias voltage is set at the quadrature point). Accordingly, the time varying AC voltage is continuously swung around the DC bias voltage in a balanced fashion.

Optical external modulators, such as the Mach-Zehnder optical modulator discussed with respect to FIG. 1, have been found useful in both analog systems, such as cable television and/or radar networks, and digital systems, such as today's long-haul-terrestrial and submarine optical networks. When used in analog systems, the applied voltage is usually between $-V_\pi$ and $V_\pi$, but does not typically reach the extremes of this range. When used in digital systems, such as with a traditional two-level digital data signal, the applied voltage is swung between 0 and $V_\pi$ and/or 0 and $-V_\pi$, so as to generate the digital 1's and 0's in the optical domain. As a result, optical analog external modulators and optical digital external modulators are generally associated with different performance concerns, and thus designs.

In optical analog external modulators, the primary performance concern appears to be the lack of linearity in the transfer function. One solution to this problem is to cascade two optical modulators in series. For example, see U.S. Pat. No. 5,168,534 to McBrien et al., U.S. Pat. No. 5,148,503 to Skeie, U.S. Pat. No. 5,249,243 to Skeie, U.S. Pat. No. 6,091,864 to Hofmeister, and U.S. Pat. No. 6,535,320 to Burns, all hereby incorporated by reference.

In optical digital external modulators, the primary performance concern appears to be the high drive power required to switch between 0 and $V_\pi$ and/or 0 and $-V_\pi$ (i.e., the high driving voltage). Various attempts to lower the drive power of optical digital external modulators have been proposed. For example, in U.S. Pat. No. 6,304,685, Burns teaches etching the lithium niobate substrate, in U.S. Pat. No. 6,341,184, Ho et al. teach including a resonator near one of the arms of a Mach-Zehnder interferometer, and in U.S. Pat. No. 6,647,158, Betts et al. teach using a specific combination of crystal axis orientation, waveguide structure, electrode structure, and biasing of a Mach-Zehnder optical modulator to lower the required drive voltage.

A second performance concern of optical digital external modulators is the breadth of the modulation bandwidth.

Modulation bandwidth is typically limited by the fact that the RF signal travels more slowly through the electrodes than the optical signal travels through the optical waveguide. Prior art methods of correcting velocity mismatch have included varying the electrode width, gap and thickness and/or varying the choice and thickness of a buffer layer deposited on the substrate.

A third performance concern in optical digital external modulators is the quality and/or integrity of the optical digital signal after it has been transmitted by the optical modulator (i.e., this factor determines the distance separating the transmitter from the receiver in use). The integrity of a digital optical signal is often characterized by an eye diagram, where a clear and symmetric eye diagram with well defined lines is associated with high transmission performance (e.g., minimal bit errors).

Referring to FIG. 2b, there is shown an eye diagram for an ideal, two-level digital signal. The eye-diagram is a superimposed plot of normalized amplitude versus time, for all the optical signals produced by the optical modulator. In other words, it shows where the digital 1's and 0's of all the bits overlap in one plot (the plot in FIG. 2b is actually two bit periods wide). The X's in the eye diagram are caused by the overlap of all the 1→0 and 0→1 transitions. The center of the X's determine the eye crossing level, which is shown having the ideal value of 50%. The digital signal is understood to be ideal in all properties except for finite (30 psec) rise and fall times.

Further discussion with respect to the quality of the digital signal and eye diagrams is provided in U.S. Pat. No. 6,687,451 to Sikora, hereby incorporated by reference.

SUMMARY OF THE INVENTION

The instant invention relates to an optical digital external modulator having a series cascaded arrangement and biasing means for providing improved transmission performance. Preferably, the modulator has a reflective design that helps to increase the modulation bandwidth, lower the drive voltage, and reduce size.

In accordance with one aspect of the instant invention there is provided an optical digital external modulator comprising: a plurality of interferometers having a cascaded arrangement; an electrode structure disposed for applying an electric field to each interferometer in the plurality of interferometers in response to an RF drive signal applied to the electrode structure; and, biasing circuitry coupled to the electrode structure for biasing each interferometer in the plurality of interferometers at a predetermined bias point, the predetermined bias point for each interferometer selected such that the optical modulator is optimized for transmitting a digital data signal through an optical fiber.

In accordance with one aspect of the instant invention there is provided an optical digital external modulator comprising: an electro-optic substrate; a plurality of interferometers formed in the electro-optic substrate, the plurality of interferometers including a first interferometer cascaded with a second interferometer such that an input port of the second interferometer is coupled to an output port of the first interferometer; a reflector optically disposed between the first and second interferometers, the reflector for redirecting light from the first interferometer to the second interferometer; an electrode structure disposed on the electro-optic substrate, the electrode structure for transmitting an electric field at least partially through each of the first and second interferometers; and, biasing circuitry coupled to the electrode structure, the biasing circuitry for biasing the first interferometer at a first predetermined bias point and the second interferometer at a second predetermined bias point, both of the first and second predetermined bias points selected such that the optical modulator is optimized for transmitting a digital data signal through an optical fiber.

In accordance with another aspect of the instant invention there is provided a method of modulating an optical signal comprising: providing an optical digital external modulator, the modulator including a plurality of interferometers having a cascaded arrangement, an electrode structure disposed for applying electric fields to each interferometer in the plurality of interferometers, and biasing circuitry coupled to the electrode structure; supplying the optical signal to the plurality of interferometers; applying an RF drive signal to the electrode structure; and, biasing each interferometer in the plurality of interferometers at a predetermined bias point, each predetermined bias point selected such that the optical modulator is optimized for transmitting a digital data signal through an optical fiber.

BRIEF DESCRIPTION OF THE DRAWINGS

Further features and advantages of the present invention will become apparent from the following detailed description, taken in combination with the appended drawings, in which:

FIG. 5b is a schematic diagram of a circuit suitable for use as the high-pass filter and bias-tee network illustrated in FIG. 5a;

It will be noted that throughout the appended drawings, like features are identified by like reference numerals.

DETAILED DESCRIPTION OF THE PREFERRED EMBODIMENTS

Figure 3:
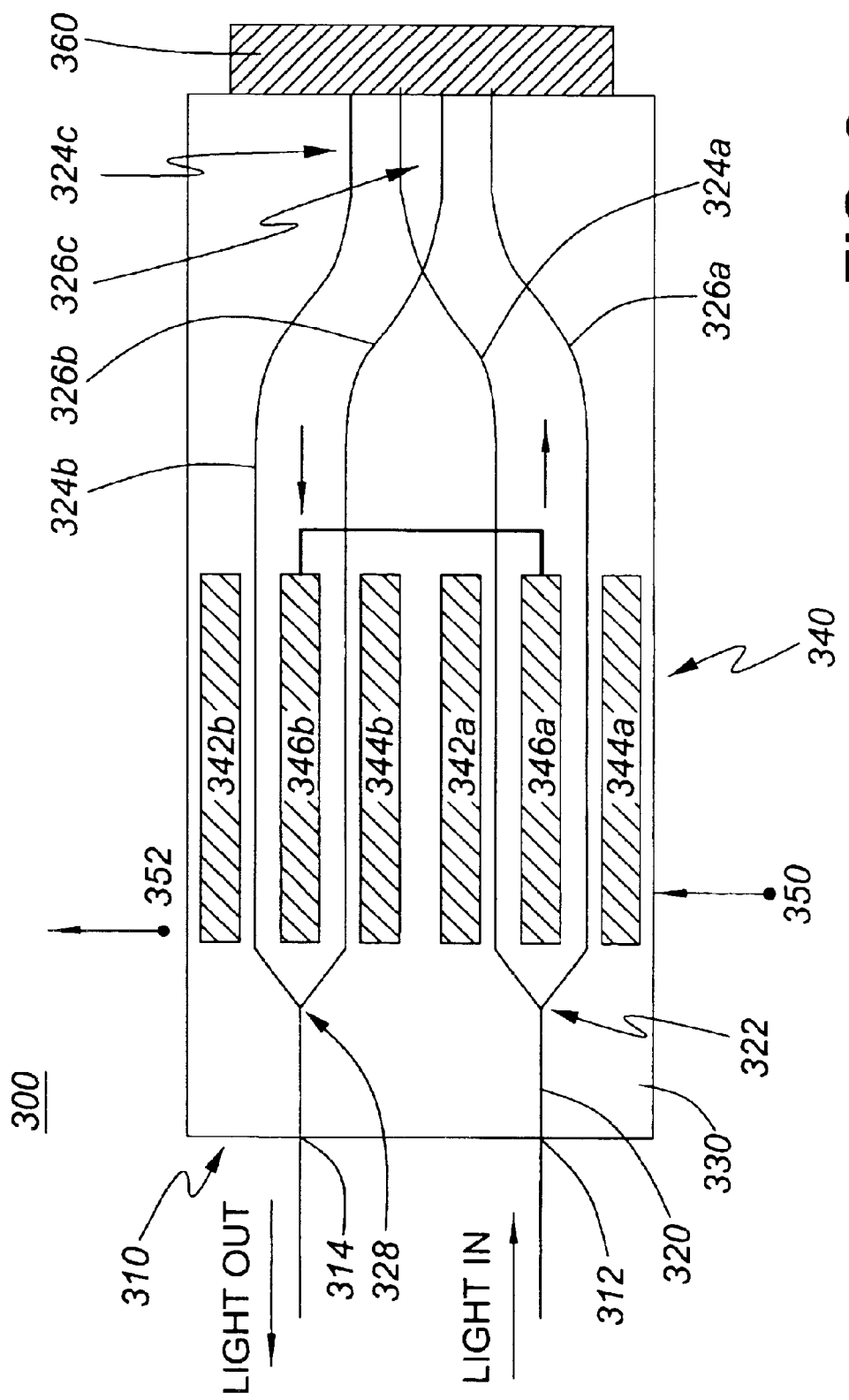
FIG. 3 is a schematic diagram of a Mach-Zehnder optical modulator formed on an x-cut lithium niobate substrate and including two reflective directional couplers.

Referring to FIG. 3, there is shown a schematic diagram of an optical digital external modulator 300 that includes an optical waveguide 320 formed in an x-cut lithium niobate (LiNbO$_3$) substrate 330. The optical waveguide 320 includes a first Y-branch 322, a first interferometer arm 324a/324b, a second interferometer arm 326a/326b, and a second Y-branch 328, which collectively form an integrated Mach-Zehnder interferometer. At the end of the substrate 330 opposing the input/output end 310, the waveguide 320 and a mirror 360 form first 324c and second 326c directional couplers. A traveling-wave electrode structure 340 is provided near the optical waveguide 320 such that the first part of the first interferometer arm 324a is disposed between ground electrode 342a and hot electrode 346a, while the first part of the second interferometer arm 326a is disposed between ground electrode 344a and hot electrode 346a. Similarly, the second part of the first interferometer arm 324b is disposed between ground electrode 342b and hot electrode 346b, while the second part of the second interferometer arm 326b is disposed between ground electrode 344b and hot electrode 346b. A single input terminal 350 provides an input for the driving and bias voltages, while a single output terminal 352 provides an output for the remaining drive signal.

In operation, light is input into the modulator 300 from the input port 312 and is output through the output port 314. More specifically, the light input through the input port propagates through the optical waveguide 320 until it is split at the first Y-branch 322, where it then propagates equally along the two isolated paths corresponding to the two interferometer arms 324a, 326a. When the light propagating through each arm of the interferometer 324a and 326a reaches the corresponding directional couplers 324c and 326c, it is reflected back along the corresponding second parts of the interferometer arms 324b and 326b, respectively. When a time varying drive voltage, corresponding to a RF data modulation signal, is applied to the traveling-wave electrode structure 340 the electro-optic effect causes the relative velocity of the light propagating through the two interferometer arms 324a/b and 326a/b to change, thus creating a phase shift and producing constructive or destructive interference at the second Y-branch 328. The constructive and/or destructive interference produces an output amplitude modulated optical signal, wherein the modulation corresponds to the modulation of the RF data signal.

Figure 1:
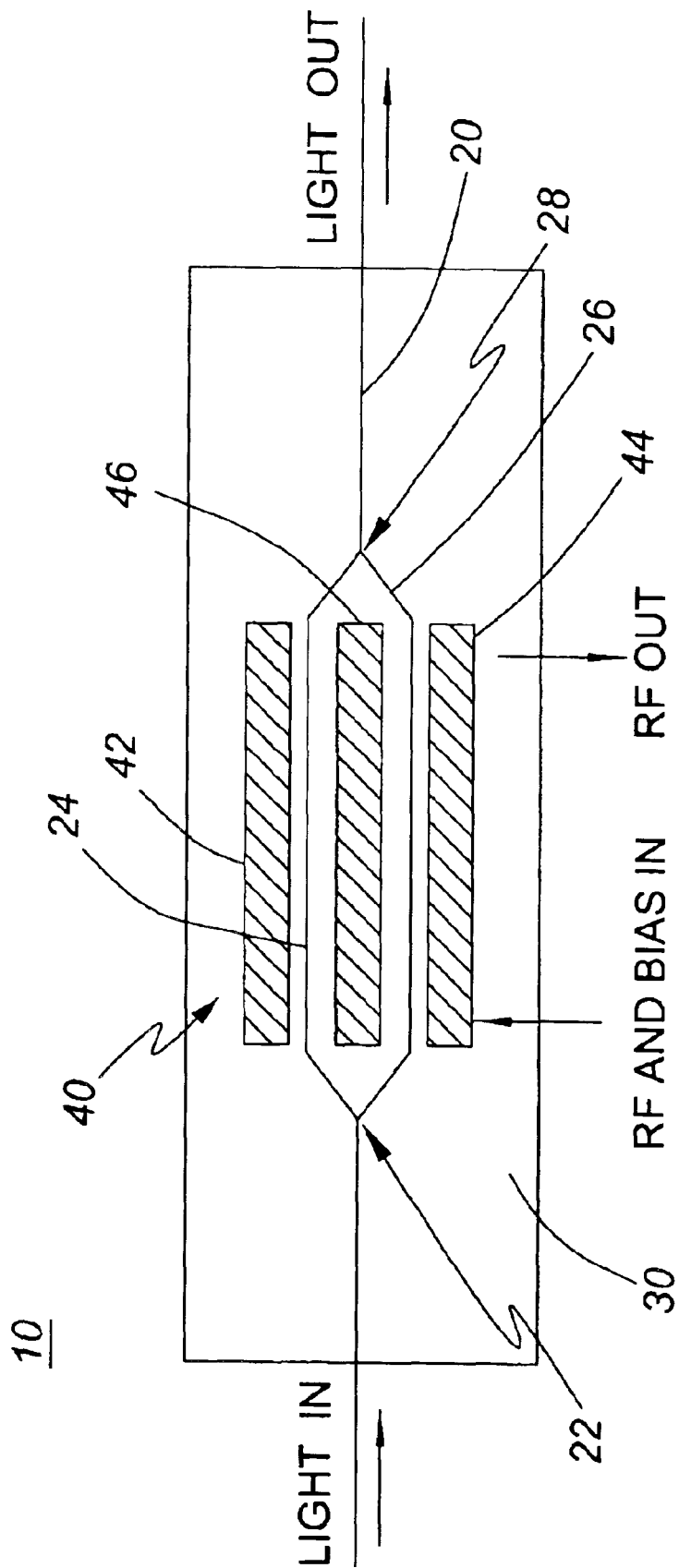
FIG. 1 is a schematic diagram of a prior art Mach-Zehnder optical modulator.
Figure 2A:
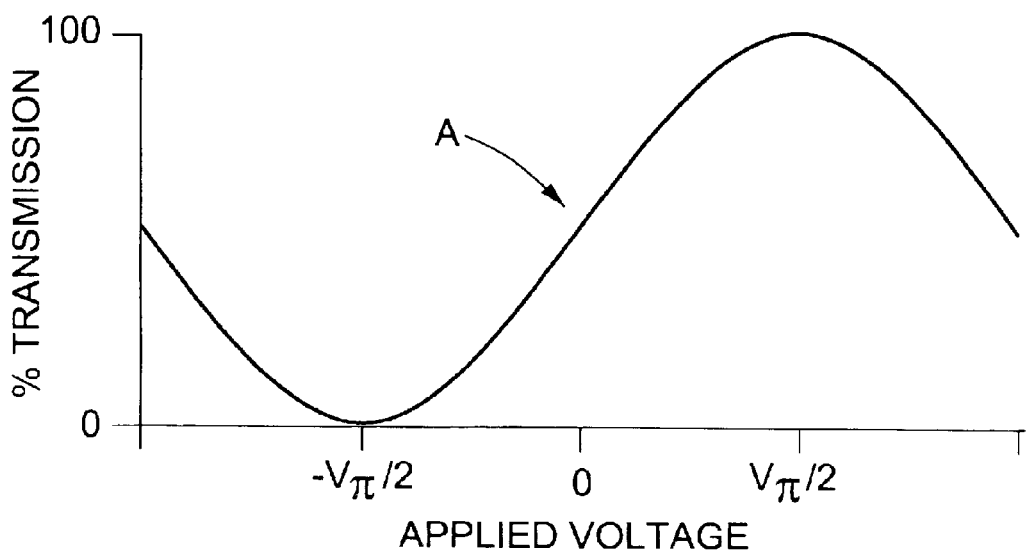
FIG. 2a is a graph of a typical transfer function.
Figure 2B:
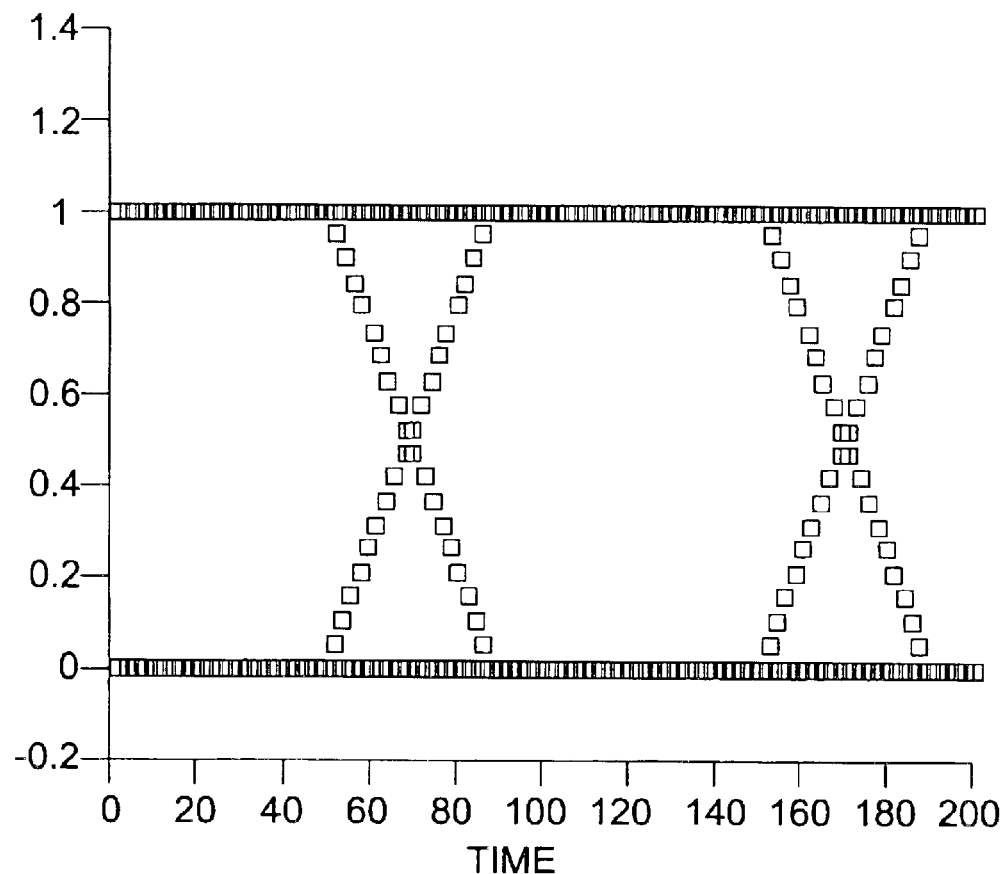
FIG. 2b is a digital eye diagram of an ideal, two-level digital signal.

One advantage of the optical modulator 300 shown in FIG. 3 compared to the optical modulator shown in FIG. 1, is that the reflective design makes the optical modulator more compact and allows light to enter and exit the optical modulator from the same side. Moreover, in comparison to a retro-reflective design, the instant design allows the light to enter and exit through two separate optical fibers, thus eliminating the need for an optical circulator. Furthermore, since the RF drive signal is terminated after it exits the electrode structure 340, it is prevented from returning to the input terminal 350, and hence the RF driver (not shown).

Another advantage of the optical modulator 300 shown in FIG. 3 is that the design allows quasi-velocity matching to be achieved. More specifically, the design of the modulator 300 allows the optical propagation time between the two electrodes 346a and 346b to be longer than the RF travel time. Accordingly, the optical modulator 300 is compatible with electrode structures that allow the RF signal to travel much slower than the light. Such electrode structures are generally more efficient than electrode structures constructed such that the optical and RF velocities match. The lagging RF signal is re-synchronized with the light via the optical time delay between electrodes. The synchronized RF signal helps to strengthen the modulation accumulated through the first section. The additional modulation efficiency is used to lower the drive voltage and/or the total length of the modulator.

Of course, the optical digital external modulator shown in FIG. 3 is described as above for exemplary purposes only. Alternatively, the optical modulator 300 is fabricated with other methods known to those skilled in the art, such as those described in Wooten et al., "A Review of Lithium Niobate Modulators for Fiber-Optic Communications Systems," EEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. Optionally, a polarizer (not shown) is provided between the substrate and the mirror and/or near the input/output ports.

Figure 4:
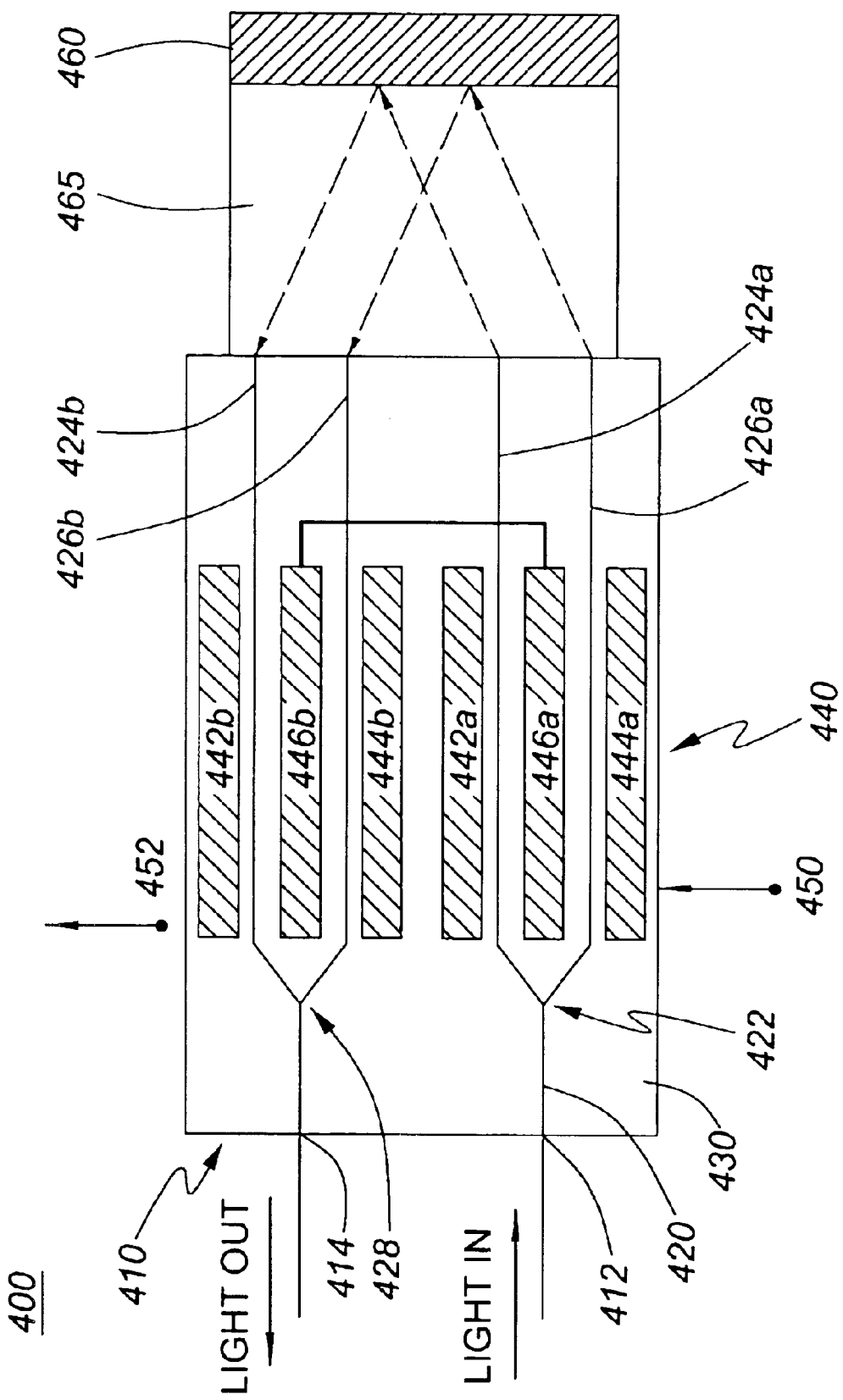
FIG. 4 is a schematic diagram of a Mach-Zehnder optical modulator formed on an x-cut lithium niobate substrate and including a reflective mirror and lens.

Referring to FIG. 4, there is shown a schematic diagram of an optical digital external modulator 400 that includes an optical waveguide 420 formed in an x-cut lithium niobate (LiNbO$_3$) substrate 430. The optical waveguide 420 includes a first Y-branch 422, a first interferometer arm 424a/424b, a second interferometer arm 426a/426b, and a second Y-branch 428, which collectively form an integrated Mach-Zehnder interferometer. At the end of the substrate 430 opposing the input/output end 410, a lens 465 and a mirror 460 are provided for reflecting light between the 424a to 424b and between 426a to 426b. A traveling-wave electrode structure 440 is provided near the optical waveguide 420 such that the first part of the first interferometer arm 424a is disposed between ground electrode 442a and hot electrode 446a, while the first part of the second interferometer arm 426a is disposed between ground electrode 444a and hot electrode 446a. Similarly, the second part of the first interferometer arm 424b is disposed between ground electrode 442b and hot electrode, 446b, while the second part of the second interferometer arm 426b is disposed between ground electrode. 444b and hot electrode 446b. A single input terminal 450 provides an input for the driving and bias voltages, while a single output terminal 452 provides an output for the remaining drive signal.

In operation, light is input into the modulator 400 through the input port 412 and is output through the output port 414. More specifically, the light input through the input port propagates through the optical waveguide 420 until it is split at the first Y-branch 422, where it then propagates equally along the two isolated paths corresponding to the two interferometer arms 424a, 426a. When the light propagating through each arm of the interferometer 424a and 426a reaches the lens 465 and mirror 460, it is reflected back along the corresponding second parts of the interferometer arms 424b and 426b, respectively. When a time varying drive voltage, corresponding to a RF data modulation signal, is applied to the traveling-wave electrode structure 440 the electro-optic effect causes the relative velocity of the light propagating through the two interferometer arms 424a/b and 426a/b to change, thus creating a phase shift and producing constructive or destructive interference at the second Y-branch 428. The constructive and/or destructive interference produces an output amplitude modulated optical signal, wherein the modulation corresponds to the modulation of the RF data signal.

In addition to the advantages discussed with reference to the optical modulator 300 illustrated in FIG. 3, the optical modulator 400 shown in FIG. 4 has the further advantage that the lens 465 and mirror 460 do not need to be precisely tuned in the same manner as the directional couplers shown in FIG. 3. As a result, the risk that the some of the light will not be coupled over to the other waveguide, and thus return back to the optical input is low. Furthermore, there is little risk that residual or backscattered light from the transmission link will be reflected back into the link.

Of course, the optical digital external modulator shown in FIG. 4 is described as above for exemplary purposes only. Alternatively, the optical modulator 400 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such-as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. Optionally, the mirror is replaced with a prism. Further optionally, a polarizer (not shown) is provided between the substrate and the lens and/or near the input/output ports.

Figure 5A:
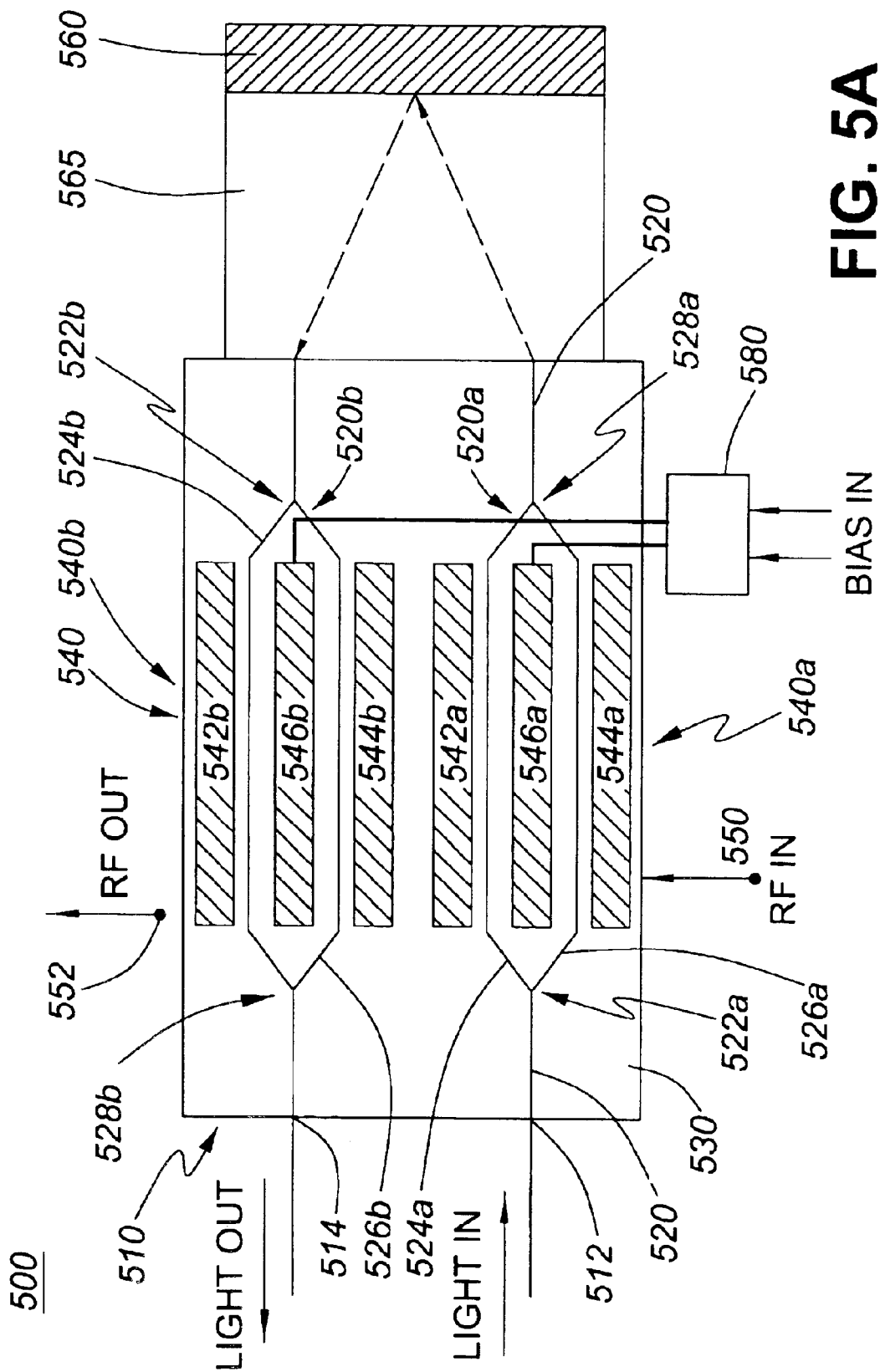
FIG. 5a is a schematic diagram of a Mach-Zehnder optical modulator formed on an x-cut lithium niobate substrate and including a reflective mirror and lens, the optical modulator has a series cascaded arrangement and biasing means in accordance with one embodiment of the instant invention.

Referring to FIG. 5a, there is shown a schematic diagram of an optical digital external modulator 500 in accordance with an embodiment of the instant invention that includes an optical waveguide 520 formed in an x-cut lithium niobate (LiNbO$_3$) substrate 530. The optical waveguide 520 forms a first Mach-Zehnder interferometer 520a and a second Mach-Zehnder interferometer 520b. The first 520a and second 520b interferometers have a cascaded arrangement, where the first and second interferometers are laterally displaced. The first interferometer 520a includes a first Y-branch 522a, a first interferometer arm 524a, a second interferometer arm 526a, and a second Y-branch 528a. The second interferometer 520b includes a first Y-branch 522b, a first interferometer arm 524b, a second interferometer arm 526b, and a second Y-branch 528b. At the end of the substrate 530 opposing the input/output end 510, a mirror 560 and lens 565 are provided to fold the optical path from the first interferometer 520a to the second 520b. A traveling-wave electrode structure 540 is provided near the optical waveguide 520 such that the first interferometer arm 524a of the first interferometer 520a is disposed between ground electrode 542a and hot electrode 546a, while the second interferometer arm 526a is disposed between ground electrode 544a and hot electrode 546a. Similarly, the first interferometer arm 524b of the second interferometer 520b is disposed between ground electrode 542b and hot electrode 546b, while the second interferometer arm 526b is disposed between ground electrode 544b and hot electrode 546b. A single input terminal 550 provides an input for the driving voltages, while a single output terminal 552 provides an output for the remaining drive signal. A high-pass filter and bias-tee network 580 is provided between the first 546a and second 546b hot electrodes. Preferably, the high-pass filter and bias tee network includes a high-pass filter for passing higher frequencies and rejecting lower ones and a bias-tee for injecting DC bias voltages into the RF circuit without affecting the flow of the RF.

Figure 5B:
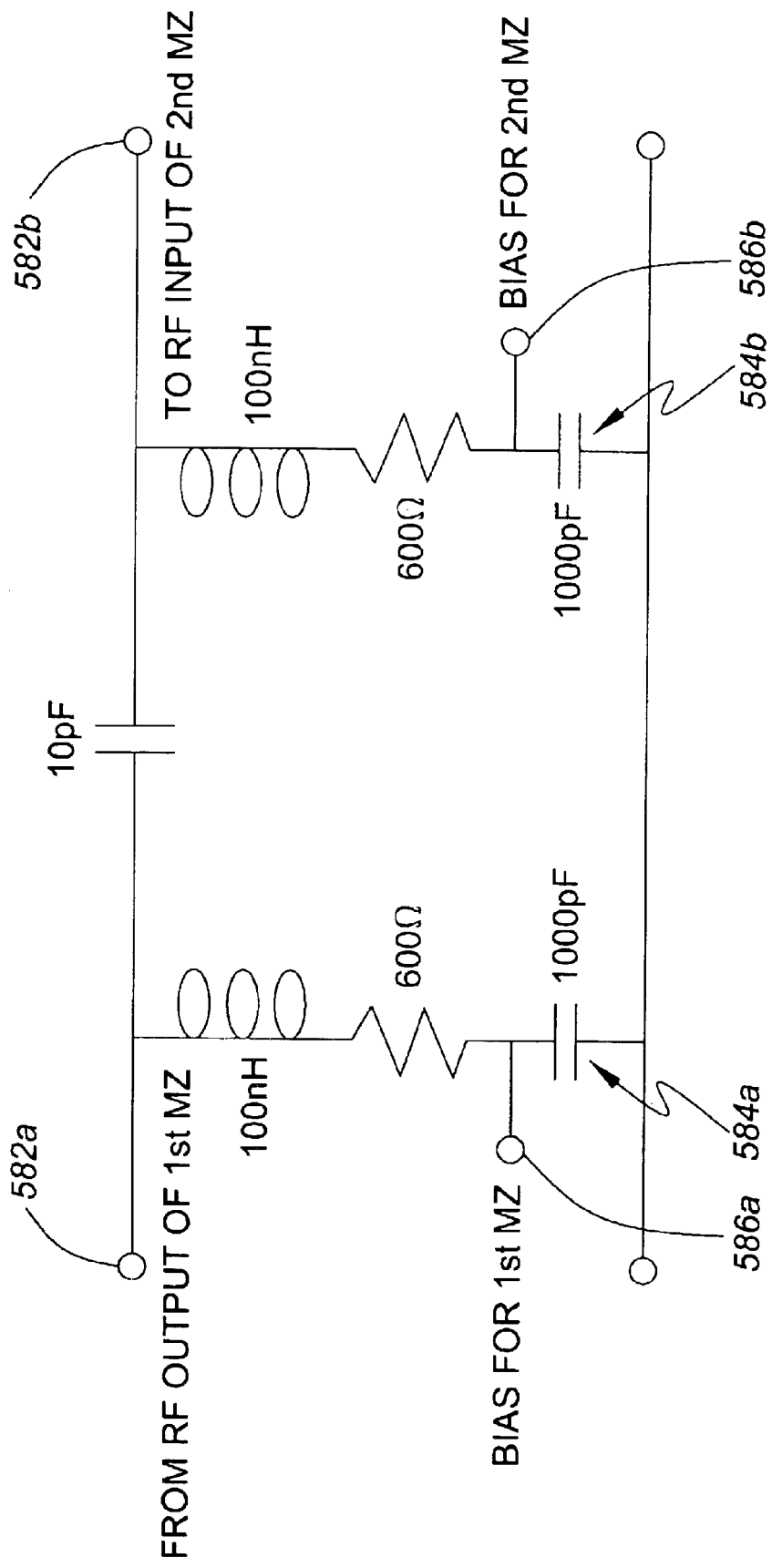

FIG. 5b illustrates one configuration of a circuit serving as a high-pass filter and bias-tee network, for use in the optical modulator illustrated in FIG. 5a. More specifically, it shows a circuit containing a 10 pF capacitor, two 100 nH inductors, two 600 Ω resistors, and two 1000 pF capacitors. The 10 pF capacitor blocks the low frequencies of the RF signal input at terminal 582a and passes the higher frequencies to terminal 582b. A first LCR shunt path 584a including one of the 100 nH inductors, 600 Ω resistors, and 1000 pF capacitors shunts the low frequencies blocked by the 10 pF capacitor and provides an input path for injecting a DC bias voltage into the first interferometer. A second LCR shunt path 584b including the other of 100 nH inductors, 600 Ω resistors, and 1000 pF capacitors provides an input path for injecting a DC bias voltage into the second interferometer. In other words, the Pi configuration allows two isolated DC voltages, which independently control the bias points of the two cascaded interferometers, to be injected at terminals 586a and 586b without disturbing the RF signal transmitted from terminal 582a to 582b. Of course other circuit configurations that provide the function of the high-pass filter and a bias-tee network are also possible.

In operation, light is input into the modulator 500 from the input port 512 and is output through the output port 514. More specifically, the light input through the input port 512 propagates through the optical waveguide 520 to the first interferometer 520a, where it is split at the first Y-branch 522a, and is transmitted equally along the two isolated paths corresponding to the two interferometer arms 524a, 526a. When a time varying voltage is applied to the first part of the electrode structure 540a via terminal 550, an electric field is produced that propagates down the traveling-wave electrode structure 540a, which is constructed to form a microwave waveguide. The electric field at least partially overlaps the two interferometer arms 524a and 526a. In accordance with the electro-optic effect, the electric field causes the relative velocity of the light propagating through the two interferometer arms 524a, 526a to change, thus creating a phase shift and producing constructive or destructive interference at the second Y-branch 528a. The constructive and/or destructive interference produces an amplitude modulated optical signal, wherein the modulation corresponds to a modulated RF data signal used to produce the time varying voltage. The amplitude modulated optical signal propagates through the optical waveguide 520 to the lens 565 and mirror 560, where it is reflected and transmitted to the second interferometer 520b. The light input into the second interferometer 520b is split at the first Y-branch 522b, where it then propagates equally along the two isolated paths corresponding to the two interferometer arms 524b, 526b. Simultaneously, the RF drive signal remaining at the end of the first electrode 546a is sent to the second part of electrode structure 540b after passing through the high pass filter 580. When the filtered RF drive signal is applied to the second part of the electrode structure 540b, an electric field is produced that propagates down the electrode structure 540b, which is constructed to form a microwave waveguide. The electric field at least partially overlaps the two interferometer arms 524b and 526b. In accordance with the electro-optic effect, the electric field further impresses the synchronized modulated RF data signal onto the amplitude modulated optical signal, which is subsequently output through the output port 514.

One advantage of the optical modulator 500 shown in FIG. 5a compared to other cascaded modulators is that the reflective design makes the optical modulator 500 more compact and allows light to enter and exit the optical modulator from the same side. Moreover, in comparison to retro-reflective designs, the instant design allows the light to enter and exit through two separate optical fibers, thus eliminating the need for an optical circulator. Furthermore, since the RF drive signal is terminated after it exits the electrode structure 540, it is prevented from returning to the input terminal 550, and hence the RF driver (not shown).

A second advantage of the optical modulator 500 shown in FIG. 5a is that the design allows quasi-velocity matching to be achieved. More specifically, the design of the modulator 500 allows the optical propagation time between the two electrodes 546a and 546b to be longer than the RF travel time. Accordingly, the optical modulator 500 is compatible with electrode structures that allow the RF signal to travel much slower than the light. Such electrode structures are generally more efficient than electrode structures constructed such that the optical and RF velocities match. The lagging RF signal is re-synchronized with the light via the optical time delay between electrodes. The synchronized RF signal helps to strengthen the modulation accumulated through the first section. The additional modulation efficiency is used to lower the drive voltage and/or the total length of the modulator.

A third advantage of the optical modulator 500 shown in FIG. 5a is that it is broken up into two interferometers, namely, a forward interferometer 520a and a reverse path interferometer 520b. Accordingly, the lens 565 and mirror 560 are not part of the interferometer. Since the lens and mirror are only used to fold the optical beam, rather than folding the interferometer arms, biasing shifts associated with temperature changes, aging, vibration, and/or shock are minimized.

A fourth advantage of the optical modulator 500 shown in FIG. 5a is that the design allows for both the forward interferometer and the reverse path interferometer to be driven with the same RF drive signal, thus eliminating the challenge of synchronizing two or more RF data signals and reducing the required drive power.

By providing a high-pass filter 580 between the cascaded interferometers, the frequency response of the optical modulator 500 is easily shaped. More specifically, the high-pass filter 580 advantageously reduces the amount of roll-off in the frequency response by only allowing the higher frequencies to pass to the second interferometer, thus reducing the interaction length of the electrode structure 540 by a factor of 2 for the lower RF frequencies. This lowers the modulation efficiency for the lower frequencies and produces a flatter frequency response. Notably, the roll-off arises from velocity walk-off and RF loss within each of the first and second interferometers.

A fifth advantage of the optical modulator 500 shown in FIG. 5a, is that it is easily optimized for digital signal transmission by selecting the digital RF data signal amplitude and bias points accordingly. For example, in traditional Mach-Zehnder optical modulators the interferometer is typically biased at the quadrature point of the single interferometer so as to maximize the on/off ratio.

Figure 5C:
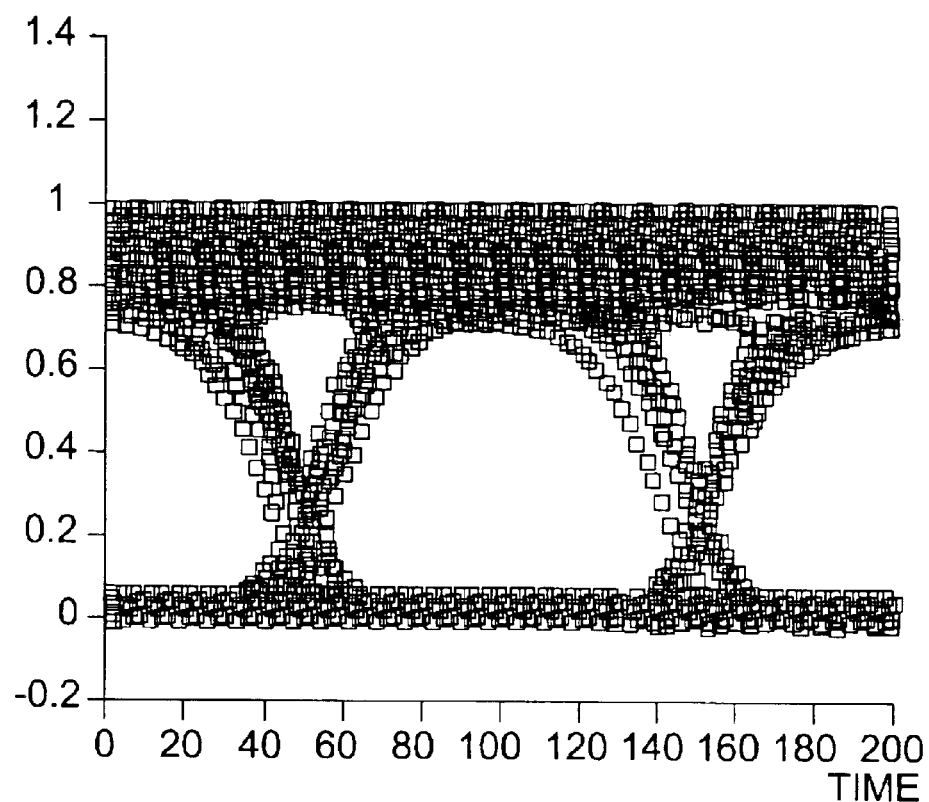
FIG. 5c is a simulated eye diagram of an optical signal after passing through the optical modulator shown in FIG. 5a, when both interferometers are biased at quadrature.

FIG. 5c illustrates a simulated eye diagram of an optical signal after passing through the optical modulator shown in FIG. 5a, when both interferometers are biased at quadrature. The simulation accounts for RF loss, quasi-velocity matching, and high-pass filter effects. Notably, there is vertical asymmetry in the shape of the eye. More specifically, the eye crossing level is about 25% rather than the preferred 50%, and the ones (full-on) are broadened in the vertical direction more than the zeros (full-off). This distortion, which is due to the multiplication of the transfer functions of the two interferometers, will negatively affect transmission performance, particularly after long transmission distances.

According to the instant invention, the optical modulator is biased for a very slight insertion loss at the on-state (e.g., less than 1 dB). For example, according to one embodiment both interferometers are biased 25° from quadrature, or at 65°, where 90° is the phase at quadrature and 0° is the phase for the interferometers being full-on. In this instance, the net intensity after passing through both interferometers is approximately at the half-power point, when no RF is applied.

Figure 5D:
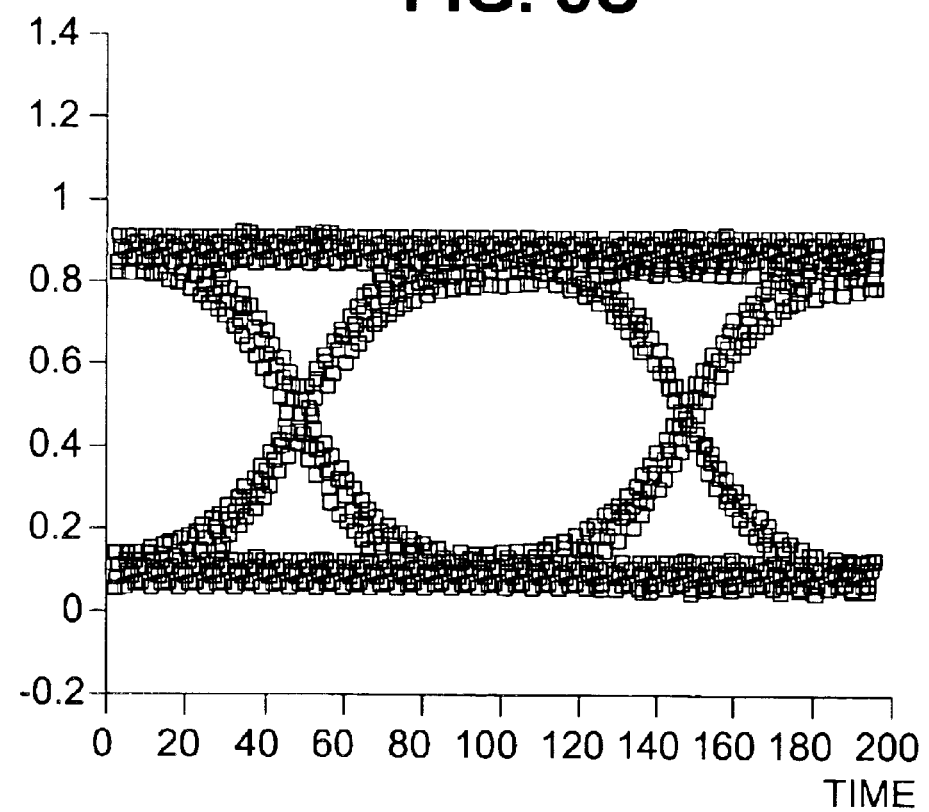
FIG. 5d is a simulated eye diagram of an optical signal after passing through the optical modulator shown in FIG. 5a, when both interferometers are biased 25° from quadrature.

FIG. 5d illustrates a simulated eye diagram of an optical signal after passing through the optical modulator shown in FIG. 5a, when both interferometers are biased 25° from quadrature. The simulation accounts for RF loss, quasi-velocity matching, and high-pass filter effects. The simulation also includes under-driving the modulator. Notably, there is essentially no asymmetry in the shape of the eye. More specifically, the eye crossing level is about 50%, and the ones (full-on) and zeros (full-off) have approximately equal vertical width. In other words, these bias point settings theoretically provide a symmetric data eye. Of course, other bias points that also provide a compromise between insertion loss, drive voltage, and on/off ratio are also possible.

Advantageously, biasing both interferometers in the optical modulator off quadrature also allows the off excursions of the RF data signal to pass through a relatively linear portion of the transfer function, i.e., the middle portion. This allows the digital data to experience a greater degree of linearity in the electrical to optical transductance. The greater linearity reduces the size of the side lobes in the optical spectrum of the modulated optical signal, especially when the electrical signal applied to the modulator is band-limited. Band-limiting truncates the electrical spectrum of the RF data signal, and thus the width of the optical spectrum, such that there is an increase in tolerance to fiber dispersion. The larger dispersion tolerance permits transmission over longer fiber distance, with much less distortion in the transmitted digital signal than with a conventional optical modulator at the same distance.

Under-driving the optical modulator advantageously results in even greater linearity of the transfer function. The improved linearity further improves the performance over long lengths of dispersive fiber, such as 120 km of single mode fiber. Under-driving the cascaded modulator also results in a lower on/off ratio (9 dB) and about 0.5 db optical loss compared to a modulator based on a single interferometer, due to the fact that the cascaded modulator is never turned completely on or off.

Of course, the optical digital external modulator shown in FIG. 5a is described as above for exemplary purposes only. Alternatively, the optical modulator 500 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Further optionally, a polarizer (not shown) is provided between the substrate and the lens and/or near the input/output ports.

Figure 6:
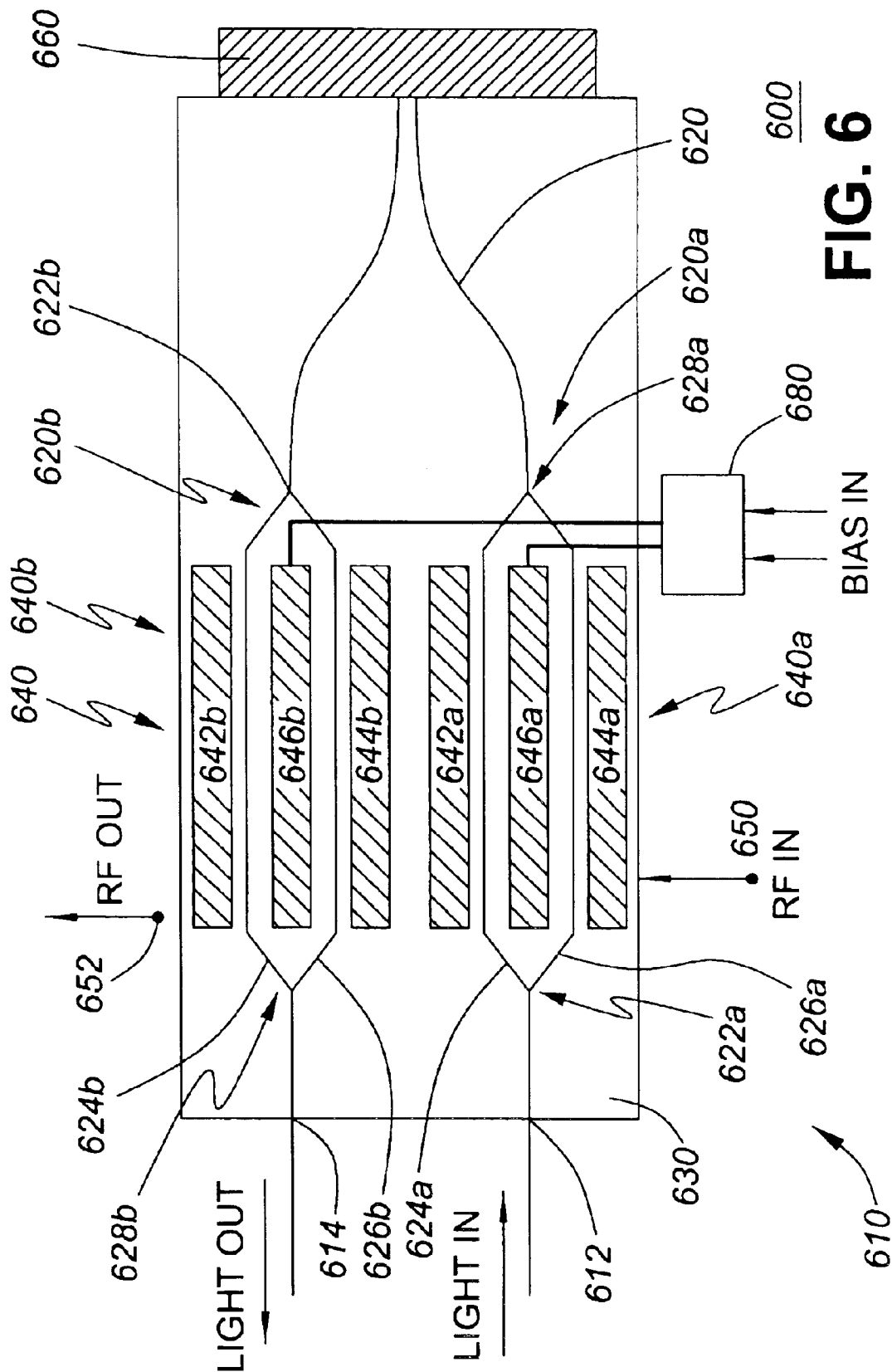
FIG. 6 is a schematic diagram of a Mach-Zehnder optical modulator formed on an x-cut lithium niobate substrate and including a reflective directional coupler, the optical modulator has a series cascaded arrangement and biasing means in accordance with another embodiment of the instant invention.

Referring to FIG. 6, there is shown a schematic diagram of an optical digital external modulator 600 in accordance with another embodiment of the instant invention that includes an optical waveguide 620 formed in an x-cut lithium niobate ($LiNbO_3$) substrate 630. The optical waveguide 620 forms a first Mach-Zehnder interferometer 620a and a second Mach-Zehnder interferometer 620b. The first interferometer 620a includes a first Y-branch 622a, a first interferometer arm 624a, a second interferometer arm 626a, and a second Y-branch 628a. The second interferometer 620b includes a first Y-branch 622b, a first interferometer arm 624b, a second interferometer arm 626b, and a second Y-branch 628b. At the end of the substrate 630 opposing the input/output end 610, the optical waveguide 620 and mirror 660 form a reflective direction coupler for folding the optical path from the first interferometer 620a to the second 620b. A traveling-wave electrode structure 640 is provided near the optical waveguide 620 such that the first interferometer arm 624a is disposed between ground electrode 642a and hot electrode 646a, while the second interferometer arm 626a is disposed between ground electrode 644a and hot electrode 646a. Similarly, the first interferometer arm 624b is disposed between ground electrode 642b and hot electrode 646b, while the second interferometer arm 626b is disposed between ground electrode 644b and hot electrode 646b. A single input terminal 650 provides an input for the driving voltages, while a single output terminal 652 provides an output for the remaining drive signal. A high-pass filter and bias-tee network 680 is provided between the first 646a and second 646b hot electrodes. The high-pass filter and bias tee network includes a high-pass filter for passing higher frequencies and rejecting lower ones and bias-tees for injecting DC bias voltages into the RF circuit without affecting the flow of the RF. For example, FIG. 5b illustrates one configuration of a circuit suitable for use as the high-pass filter and bias-tee network 680.

In operation, light is input into the modulator 600 from the input port 612 and is output through the output port 614. More specifically, the light input through the input port 612 propagates through the optical waveguide 620 to the first interferometer 620a, where it is split at the first Y-branch 622a, and is transmitted equally along the two isolated paths corresponding to the two interferometer arms 624a, 626a. When a time varying voltage is applied to the first part of the electrode structure 640a via terminal 650, an electric field is produced that propagates down the first part of the traveling-wave electrode structure 640a, which is constructed to form a microwave waveguide. The electric field at least partially overlaps the two interferometer arms 624a and 626a. In accordance with the electro-optic effect, the electric field causes the relative velocity of the light propagating through the two interferometer arms 624a, 626a to change, thus creating a phase shift and producing constructive or destructive interference at the second Y-branch 628a. The constructive and/or destructive interference produces an amplitude modulated optical signal, wherein the modulation corresponds to a modulated RF data signal used to produce the time varying voltage. The amplitude modulated optical signal propagates through the optical waveguide 620 to the mirror 660 where it is reflected and transmitted to the second interferometer 620b. The light input into the second interferometer 620b is split at the first Y-branch 622b, where it then propagates equally along the two isolated paths corresponding to the two interferometer arms 624b, 626b. Simultaneously, the RF drive signal remaining at the end of the first part of the electrode structure 640a is sent to the second part of the electrode structure 640b after passing through the high pass filter 680. When the filtered RF drive signal is applied to the second part of the electrode structure 640b, an electric field is produced that propagates down the electrode structure 640b, which is constructed to form a microwave waveguide. The electric field at least partially overlaps the two interferometer arms 624b and 626b. In accordance with the electro-optic effect, the electric field further impresses the synchronized modulated RF data signal onto the amplitude modulated optical signal, which is subsequently output through the output port 614.

In addition to the first, second, fourth, and fifth advantages of the optical modulators discussed with reference to FIG. 5a, the optical modulator shown in FIG. 6 has the additional advantage that the directional coupler does not form part of the Mach-Zehnder interferometer. Since the directional coupler is only used to fold the optical beam, rather than folding the interferometer arms, biasing shifts associated with temperature changes, aging, vibration, and/or shock are minimized. Furthermore, the optical modulator illustrated in FIG. 6 only requires a mirror or reflective surface beyond what is on the substrate/chip.

Of course, the optical digital external modulator shown in FIG. 6 is described as above for exemplary purposes only. Alternatively, the optical modulator 600 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, a polarizer (not shown) is provided between the substrate and the lens and/or near the input/output ports. Further optionally, the need for the mirror is obviated by designing the optical waveguide 620 with a u-turn rather than as a directional coupler.

Figure 7:
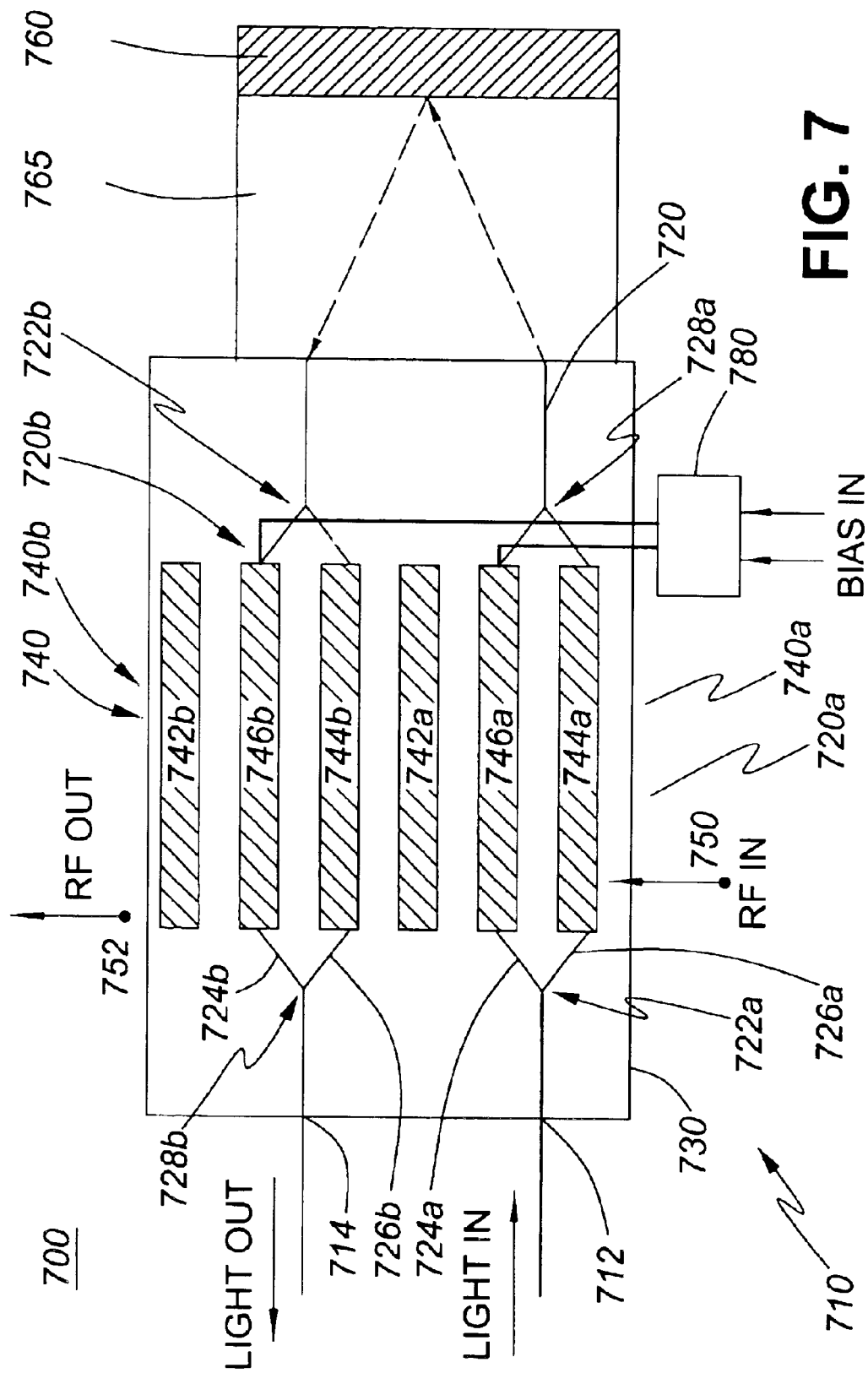
FIG. 7 is a schematic diagram of a Mach-Zehnder optical modulator formed on a z-cut lithium niobate substrate and including a reflective mirror and lens, the optical modulator has a series cascaded arrangement and biasing means in accordance with other embodiment of the instant invention.

Referring to FIG. 7, there is shown a schematic diagram of an optical digital external modulator 700 in accordance with another embodiment of the instant invention that includes an optical waveguide 720 formed in an z-cut lithium niobate ($LiNbO_3$) substrate 730. The optical waveguide 720 includes a first Mach-Zehnder interferometer 720a and a second Mach-Zehnder interferometer 720b. The first interferometer 720a includes a first Y-branch 722a, a first interferometer arm 724a, a second interferometer arm 726a, and a second Y-branch 728a. The second interferometer 720b includes a first Y-branch 722b, a first interferometer arm 724b, a second interferometer arm 726b, and a second Y-branch 728b. At the end of the substrate 730 opposing the input/output end 710, a mirror 760 and lens 765 are provided to fold the optical path from the first interferometer 720a to the second 720b. A traveling-wave electrode structure 740 including ground electrodes 742a, 744a, 742b, and 744b and hot electrodes 746a and 746b is provided near the optical waveguide 720 such that the first interferometer arm 724a is disposed beneath hot electrode 746a, while the second interferometer arm 726a is disposed beneath ground electrode 744a. Similarly, the first interferometer arm 724b is disposed beneath hot electrode 746b, while the second interferometer arm 726b is disposed beneath ground electrode 744b. A single input terminal 750 provides an input for the driving voltages, while a single output terminal 752 provides an output for the remaining drive signal. A high-pass filter and bias-tee network 780 is provided between the first 746a and second 746b hot electrodes. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light is input into the modulator 700 from the input port 712 and is output through the output port 714. More specifically, the light input through the input port 712 propagates through the optical waveguide 720 to the first interferometer 720a, where it is split at the first Y-branch 722a, and is transmitted equally along the two isolated paths corresponding to the two interferometer arms 724a, 726a. When a time varying voltage is applied to the first part of the electrode structure 740a via terminal 750, an electric field is produced that propagates down the first part of the traveling-wave electrode structure 740a, which is constructed to form a microwave waveguide. The electric field at least partially overlaps the two interferometer arms 724a and 726a. In accordance with the electro-optic effect, the electric field causes the relative velocity of the light propagating through the two interferometer arms 724a, 726a to change, thus creating a phase shift and producing constructive or destructive interference at the second Y-branch 728a. The constructive and/or destructive interference produces an amplitude modulated optical signal, wherein the modulation corresponds to a modulated RF data signal used to produce the time varying voltage. The amplitude modulated optical signal propagates through the optical waveguide 720 to the lens 765 and mirror 760, where it is reflected and transmitted to the second interferometer 720b. The light input into the second interferometer 720b is split at the first Y-branch 722b, where it then propagates equally along the two isolated paths corresponding to the two interferometer arms 724b, 726b. Simultaneously, the RF drive signal remaining at the end of the first part of the electrode structure 740a is sent to the second part of the electrode structure 740b after passing through the high pass filter 780. When the filtered RF drive signal is applied to the second part of the electrode structure 740b, an electric field is produced that propagates down the electrode structure 740b, which is constructed to form a microwave waveguide. The electric field at least partially overlaps the two interferometer arms 724b and 726b. In accordance with the electro-optic effect, the electric field further impresses the synchronized modulated RF data signal onto the amplitude modulated optical signal, which is subsequently output through the output port 714.

In addition to the advantages discussed with reference to FIG. 5a, the optical modulator 700 exhibits the additional advantages associated with z-cut lithium niobate. More specifically, since the electrodes run underneath the electrodes and since the hot electrodes 746a and 746b produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer.

Of course, the optical digital external modulator shown in FIG. 7 is described as above for exemplary purposes only. Alternatively, the optical modulator 700 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Optionally, a polarizer (not shown) is provided between the substrate and the lens and/or near the input/output ports.

Figure 8:
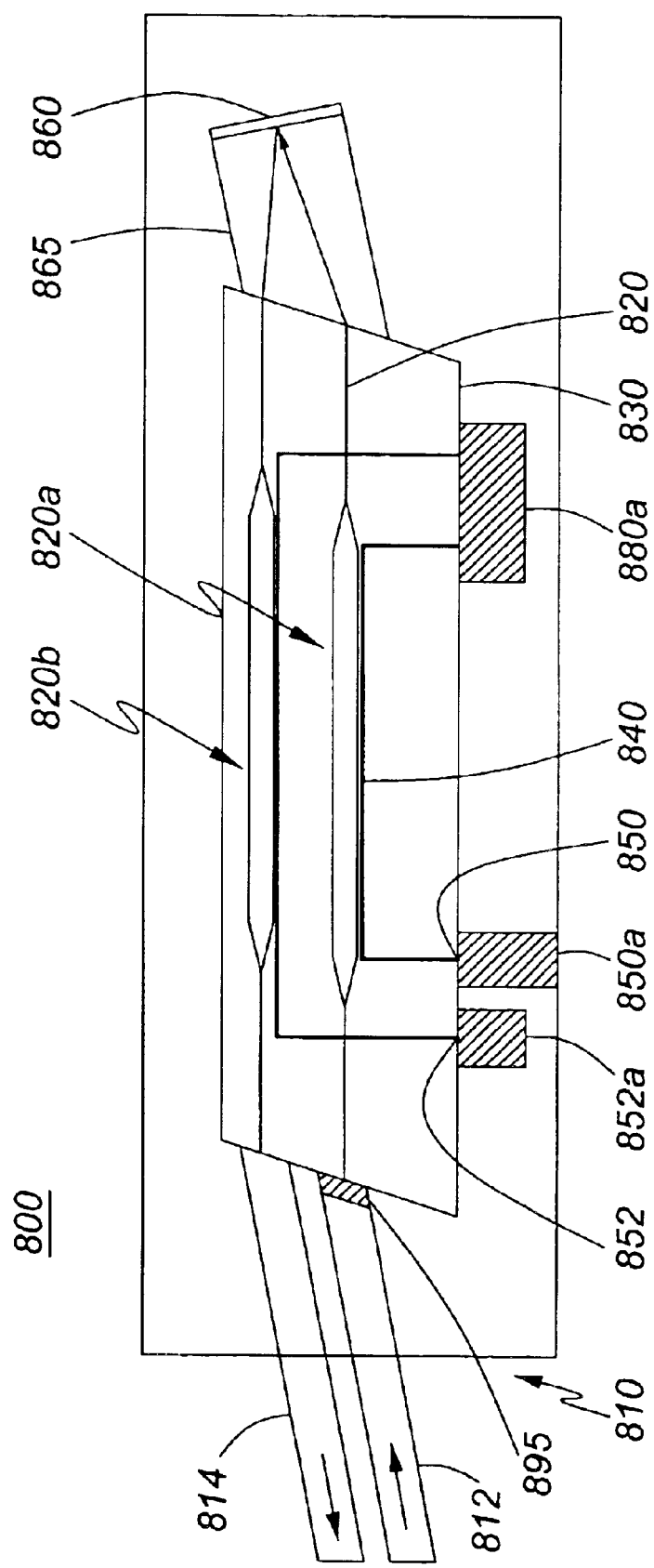
FIG. 8 is an enhanced schematic diagram of a Mach-Zehnder optical modulator formed on a z-cut lithium niobate substrate and including beam folding micro-optics, the optical modulator has a series cascaded arrangement and biasing means in accordance with yet another embodiment of the instant invention.

Referring to FIG. 8, there is shown a schematic diagram of an optical digital external modulator 800 in accordance with yet another embodiment of the instant invention that includes an optical waveguide 820 formed in an z-cut lithium niobate (LiNbO$_3$) substrate 830. The optical waveguide 820 includes a first Mach-Zehnder interferometer 820a and a second Mach-Zehnder interferometer 820b. Input 812 and output 814 optical fibers are attached to one end 810 of the substrate 830. Optionally, the two fibers are aligned and mounted to the substrate with silicon V-grooves. At the end of the substrate 830 opposing the input/output end 810, beam folding micro-optics are provided to fold the optical path from the first interferometer 820a to the second 820b. More specifically, the beam folding micro-optics include a GRIN lens 865 and a reflective coating 860. A traveling-wave electrode structure 840, which for improved clarity does not show the individual electrodes, is provided near the first and second interferometers 820a and 820b. A single input terminal 850 provides an input for the driving voltages, while a single output terminal 852 provides an output for the remaining drive signal. Each of the input 850 and output 852 terminals are coupled to a separate ceramic substrate 850a and 852a on which the RF launch and RF termination circuits are formed, respectively. An RF driver (not shown) is coupled to the RF launch ceramic 850a. A high-pass filter and bias-tee network (not shown) is provided on a third substrate 880a and forms part of the electrical path linking the first and second stages of the optical modulator. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network. A polarizer 895 is provided between the substrate and the input optical fiber 812 to attenuate the unwanted polarization state.

In operation, light is input into the modulator 800 from the input fiber 812 and is output the output fiber, 814. More specifically, the light input through the input fiber 812 propagates through the optical waveguide 820 to the first interferometer 820a. When a time varying voltage is applied to the electrode structure 840 via terminal 850, an electric field is produced that propagates down the traveling-wave electrode structure 840, which is constructed to form a microwave waveguide. The electric field at least partially overlaps the two interferometer arms of the first interferometer 820a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 820 to the reflective surface 860, where it is reflected and transmitted to the second interferometer 820b. Simultaneously, the RF drive signal remaining at the end of the first interferometer 820a passes through the high pass filter and is applied to the second interferometer 820b. This creates an electric field that propagates down the electrode structure 840, which is constructed to form a microwave waveguide, and at least partially overlaps the two interferometer arms of the second interferometer 820b. In accordance with the electro-optic effect, the electric field further impresses the synchronized modulated RF data signal onto the amplitude modulated optical signal, which is subsequently output the output fiber 814.

In addition to the advantages discussed with reference to FIG. 5a, the optical modulator 800 exhibits the additional advantages associated with z-cut lithium niobate. More specifically, since the electrodes run underneath the electrodes and since the hot electrodes produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer.

Of course, the optical digital external modulator shown in FIG. 8 is described as above for exemplary purposes only. Alternatively, the optical modulator 800 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, the reflective surface is replace with another reflector such as a prism.

Figure 9:
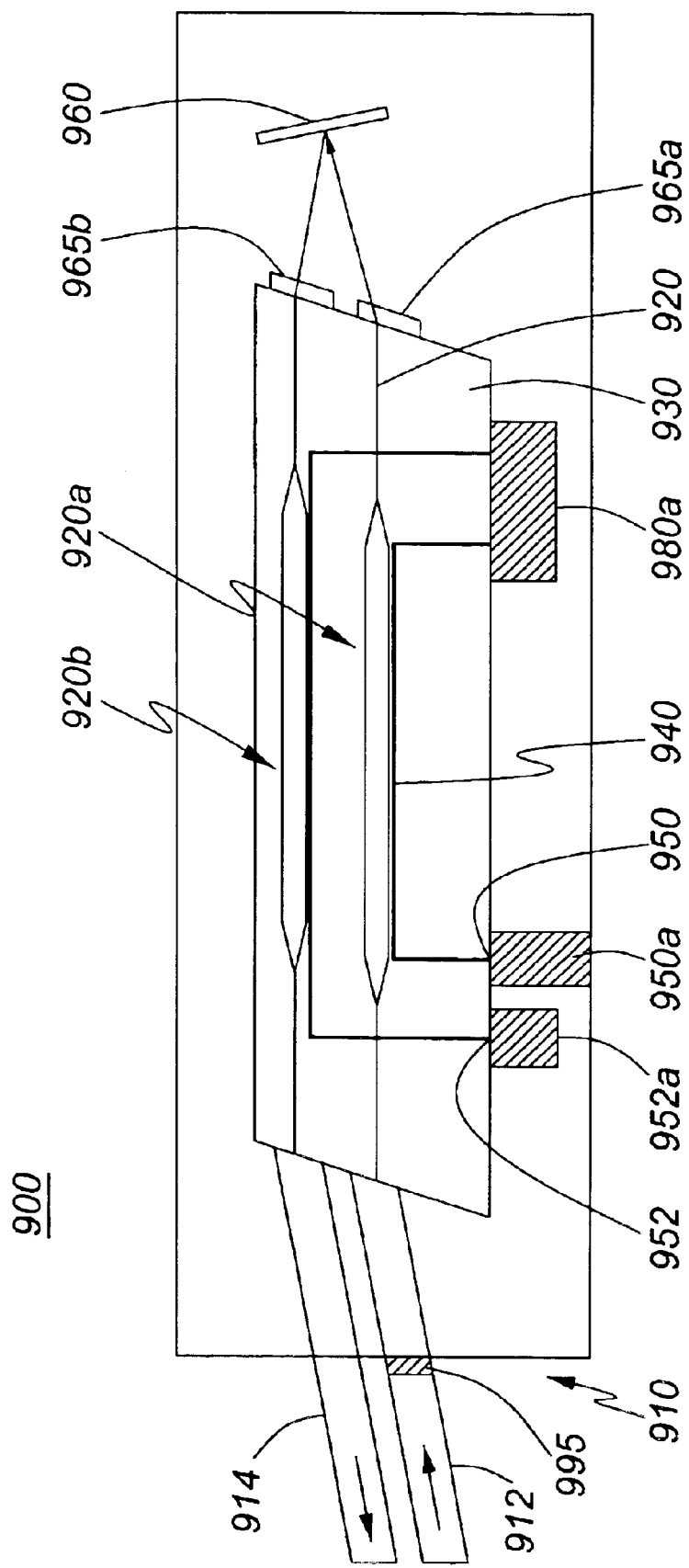
FIG. 9 is an enhanced schematic diagram of a Mach-Zehnder optical modulator formed on a z-cut lithium niobate substrate and including a VOA function via a MEMS mirror, the optical modulator has a series cascaded arrangement and biasing means in accordance with another embodiment of the instant invention.

Referring to FIG. 9, there is shown a schematic diagram of an optical digital external modulator 900 in accordance with yet another embodiment of the instant invention that includes an optical waveguide 920 formed in an z-cut lithium niobate (LiNbO$_3$) substrate 930. The optical waveguide 920 includes a first Mach-Zehnder interferometer 920a and a second Mach-Zehnder interferometer 920b. Input 912 and output 914 optical fibers are attached to one end 910 of the substrate 930. Optionally, the two fibers are aligned and mounted to the substrate with silicon V-grooves. At the end of the substrate 930 opposing the input/output end 910, a mirror 960, a first lens 965a, and a second lens 965b are provided to fold the optical path from the first interferometer 920a to the second 920b. More specifically, the mirror is a micro-electro-mechanical (MEMS) mirror that is tiltable to control the amount of light that enters the second interferometer 920b. A traveling-wave electrode structure 940, which for improved clarity does not show the individual electrodes, is provided near the first and second interferometers 920a and 920b. A single input terminal 950 provides an input for the driving voltages, while a single output terminal 952 provides an output for the remaining drive signal. Each of the input 950 and output 952 terminals are coupled to a separate ceramic substrate 950a and 952a on which the RF launch and RF termination circuits are formed, respectively. An RF driver (not shown) is coupled to the RF launch ceramic 950a. A high-pass filter and bias-tee network (not shown) is provided on the third substrate 980a and forms part of the electrical path linking the first and second stages of the optical modulator. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network. A polarizer 995 is provided between the substrate and the input optical fiber 912 to attenuate the unwanted polarization state.

In operation, light is input into the modulator 900 from the input fiber 912 and is output the output fiber 914. More specifically, the light input through the input fiber 912 propagates through the optical waveguide 920 to the first interferometer 920a. When a time varying voltage is applied to the electrode structure 940 via terminal 950, an electric field is produced that propagates down the traveling-wave electrode structure 940, which is constructed to form a microwave waveguide. The electric field at least partially overlaps the two interferometer arms of the first interferometer 920a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 920 to the MEMS mirror 960, where it is reflected and transmitted to the second interferometer 920b. Simultaneously, the RF drive signal remaining at the end of the first interferometer 920a passes through the high pass filter (not shown) and is applied to the second interferometer 920b. This creates an electric field that propagates down the electrode structure 940, which is constructed to form a microwave waveguide, and at least partially overlaps the two interferometer arms of the second interferometer 920b. In accordance with the electro-optic effect, the electric field further impresses the synchronized modulated RF data signal onto the amplitude modulated optical signal, which is subsequently output the output fiber 914.

In addition to the advantages discussed with reference to FIG. 5a, the dual serial optical modulator 900 exhibits the additional advantages associated with z-cut lithium niobate. More specifically, since the electrodes run underneath the electrodes and since the hot electrodes produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer. Furthermore, incorporating a MEMS mirror advantageously provides a voltage-operated-attenuation (VOA) function.

Of course, the optical digital external modulator shown in FIG. 9 is described as above for exemplary purposes only. Alternatively, the optical modulator 900 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, the MEMS mirror is replaced with another reflector and the VOA function is achieved by including liquid crystal shutters (not shown) in the optical path.

Figure 10:
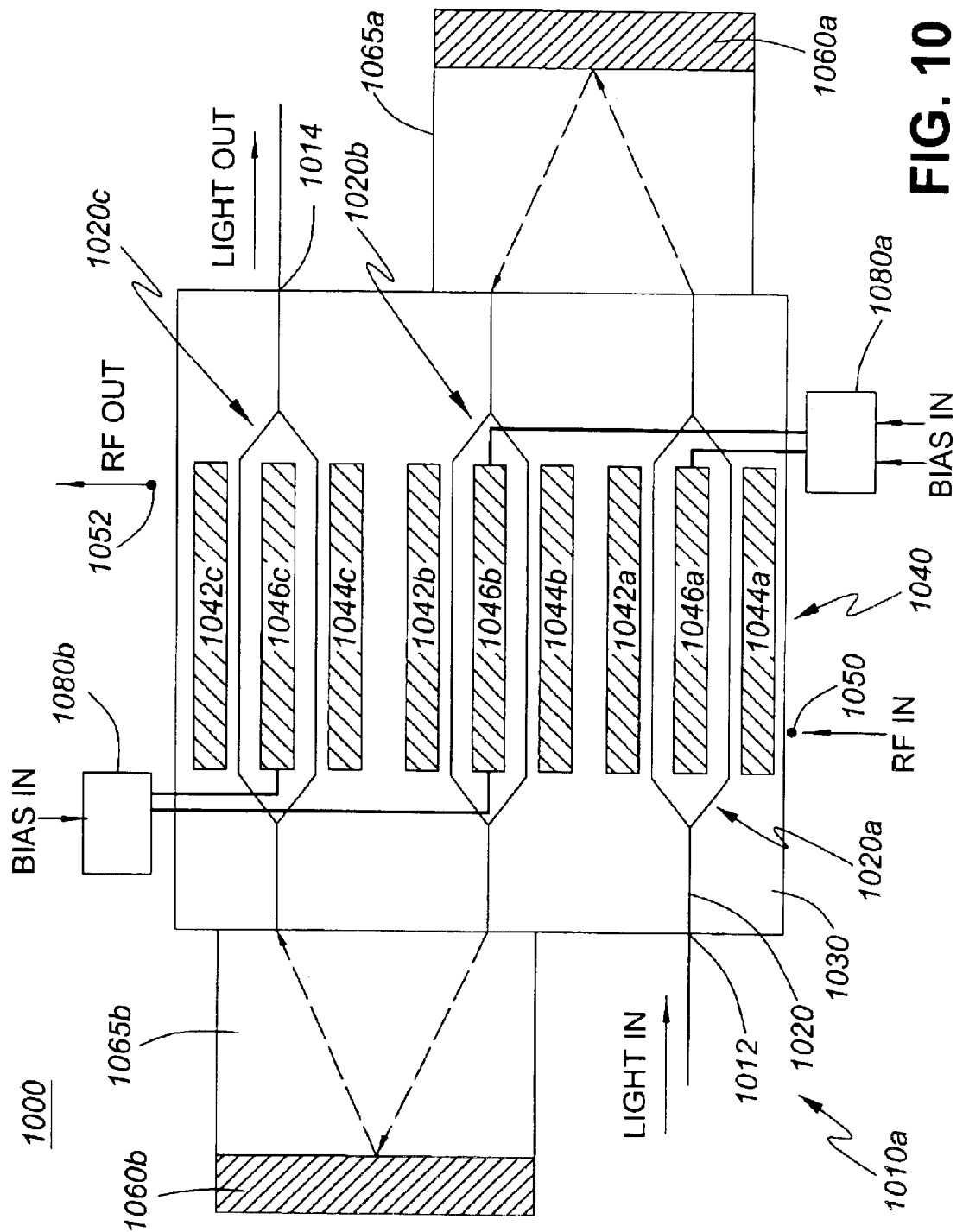
FIG. 10 is a schematic diagram of a three stage Mach-Zehnder optical modulator formed on a x-cut lithium niobate substrate and including two lenses and two mirrors, the optical modulator has a series cascaded arrangement and biasing means in accordance with another embodiment of the instant invention.

Referring to FIG. 10, there is shown a schematic diagram of an optical digital external modulator 1000 in accordance with another embodiment of the instant invention that includes an optical waveguide 1020 formed in an x-cut lithium niobate (LiNbO$_3$) substrate 1030. The optical waveguide 1020 includes a first Mach-Zehnder interferometer 1020a, a second Mach-Zehnder interferometer 1020b, and a third Mach-Zehnder interferometer 1020c. Each interferometer includes a first Y-branch, a first interferometer arm, a second interferometer arm, and a second Y-branch. At the end of the substrate 1030 opposing the input end 1010, a first mirror 1060a and first lens 1065a are provided to fold the optical path from the first interferometer 1020a to the second 1020b. At the input end 1010, a second mirror 1060b and second lens 1065b are provided to fold the optical path from the second interferometer 1020b to the third 1020c. A traveling-wave electrode structure 1040 is provided near the optical waveguide 1020 such that the first interferometer 1020a has a first arm disposed between a ground electrode 1042a and hot electrode 1046a, while the second interferometer arm is disposed between ground electrode 1044a and hot electrode 1046a. Similarly, the second interferometer 1020b has first interferometer arm disposed between ground electrode 1042b and hot electrode 1046b, while the second interferometer arm is disposed between ground electrode 1044b and hot electrode 1046b. Finally, the third interferometer 1020c has a first interferometer arm disposed between ground electrode 1042c and hot electrode 1046c, while the second interferometer arm is disposed between ground electrode 1044c and hot electrode 1046c. A single input terminal 1050 provides an input for the driving voltage, while a single output terminal 1052 provides an output for the remaining drive signal. A first high-pass filter and bias-tee network 1080a is provided between the first 1046a and second 1046b hot electrodes, while a second high-pass filter and bias-tee network 1080b is provided between the second 1046b and third 1046c hot electrodes. Preferably, each high-pass filter and bias tee network includes a high-pass filter for passing higher frequencies and rejecting lower ones and one or two bias-tees for injecting one or two DC bias voltages into the RF circuit without affecting the flow of the RF. For example, FIG. 5b shows one example of a circuit suitable for serving as each high-pass filter and bias-tee network.

In operation, light is input into the modulator 1000 from the input port 1012 and is output through the output port 1014. More specifically, the light input through the input port 1012 propagates through the optical waveguide 1020 to the first interferometer 1020a. When a time varying voltage is applied to the electrode structure 1040 via terminal 1050, an electric field is produced that propagates down the first part of the traveling-wave electrode structure 1040, which is constructed to form a microwave waveguide. The electric field at least partially overlaps the two interferometer arms of the first interferometer 1020a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1020 to the first mirror 1060a where it is reflected and transmitted to the second interferometer 1020b. Simultaneously, the RF drive signal remaining at the end of the first part of the electrode structure 1040 is sent to the second part of the electrode structure 1040 after passing through the high pass filter 1080a. When the filtered RF drive signal is applied to the second part of the electrode structure 1040, an electric field is produced that propagates down the electrode structure, which is constructed to form a microwave waveguide. The electric field at least partially overlaps the two interferometer arms in the second interferometer 1020b. In accordance with the electro-optic effect, the electric field further impresses the synchronized modulated RF data signal onto the amplitude modulated optical signal. The strengthened amplitude modulated optical signal propagates through the optical waveguide 1020 to the second mirror 1060b where it is reflected and transmitted to the third interferometer 1020c. Simultaneously, the RF drive signal remaining at the end of the second part of the electrode structure 1040 is sent to the third part of the electrode structure after passing through the second high pass filter 1080b. When the filtered RF drive signal is applied to the third part of the electrode structure 1040, an electric field is produced that propagates down the electrode structure 1040, which is constructed to form a microwave waveguide. The electric field at least partially overlaps the two interferometer arms of the third interferometer 1020c. In accordance with the electro-optic effect, the electric field further impresses the synchronized modulated RF data signal onto the amplitude modulated optical signal to create an even stronger amplitude modulated optical signal, which is subsequently output through the output port 1014.

In addition to the advantages of the optical modulator discussed with reference to FIG. 5a, the three stage optical modulator shown in FIG. 10 has the additional advantage that the overall device length is approximately one-third the length of a conventional modulator.

Of course, the optical digital external modulator shown in FIG. 10 is described as above for exemplary purposes only. Alternatively, the optical modulator 1000 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Further optionally, a polarizer (not shown) is provided between the substrate and the lens and/or near the input/output ports. Further optionally, a DOC (not shown) is mounted on the substrate for tapping light to provide power monitoring and/or feedback for bias control.

Figure 11:
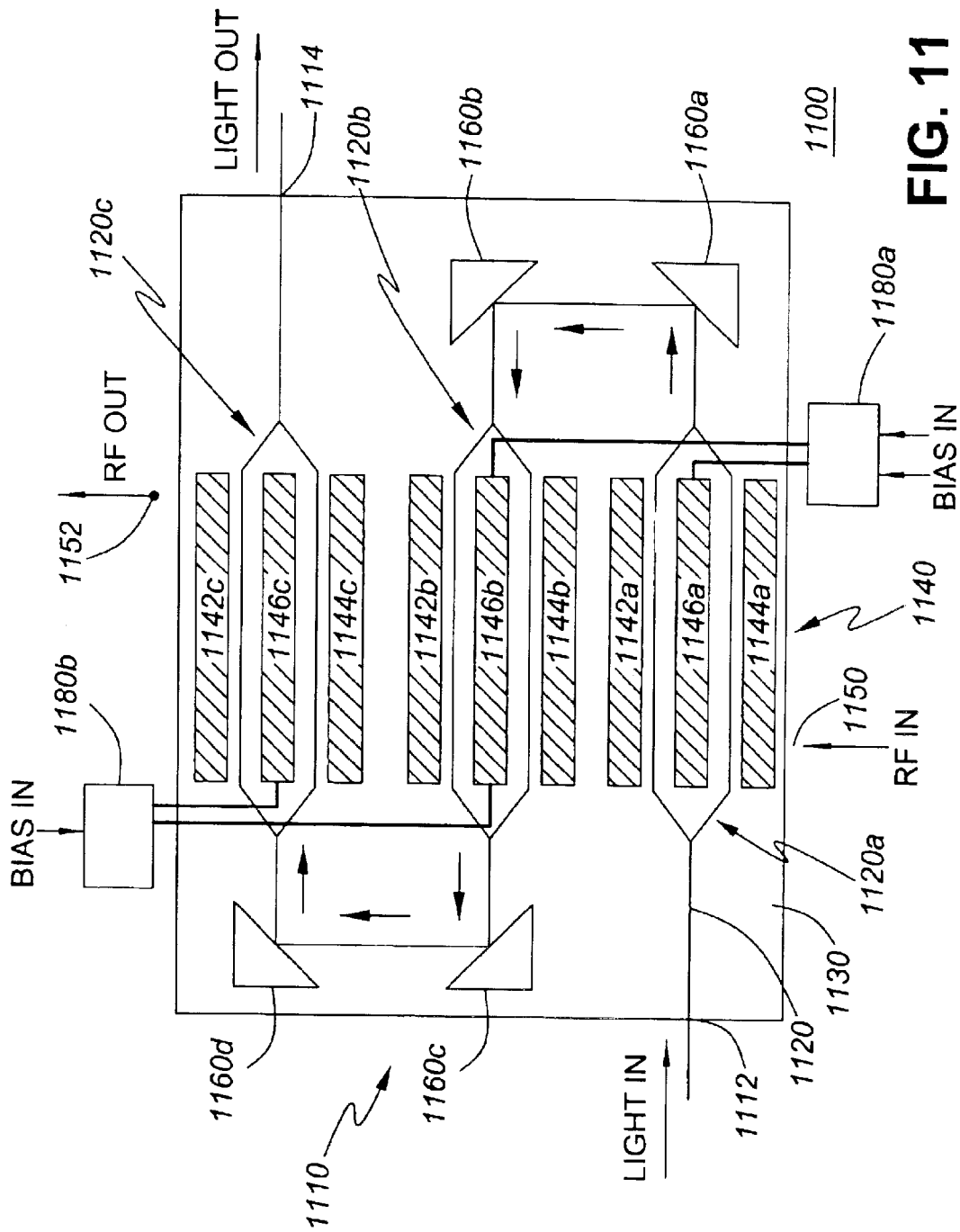
FIG. 11 is a schematic diagram of a three stage Mach-Zehnder optical modulator formed on a x-cut lithium niobate substrate and including integrated mirrors, the optical modulator has a series cascaded arrangement and biasing means in accordance with another embodiment of the instant invention.

Referring to FIG. 11, there is shown a schematic diagram of an optical digital external modulator 1100 in accordance with another embodiment of the instant invention that includes an optical waveguide 1120 formed in an x-cut lithium niobate (LiNbO$_3$) substrate 1130. The optical waveguide 1120 includes a first Mach-Zehnder interferometer 1120a, a second Mach-Zehnder interferometer 1120b, and a third Mach-Zehnder interferometer 1120c. Each interferometer includes a first Y-branch, a first interferometer arm, a second interferometer arm, and a second Y-branch. At the end of the substrate 1130 opposing the input end 1110, first 1160a and second 1160b reflective surfaces are provided to fold the optical path from the first interferometer 1120a to the second 1120b. At the input end 1110, third 1160c and fourth 1160d reflective surfaces are provided to fold the optical path from the second interferometer 1120b to the third 1120c. Preferably, the reflective surfaces are fabricated by etching a region of the substrate and metallizing the etched surfaces. Ideally, the etched surfaces are highly vertical with little tilt. A traveling-wave electrode structure 1140 is provided near the optical waveguide 1120 such that the first interferometer 1120a has a first arm disposed between a ground electrode 1142a and hot electrode 1146a, while the second interferometer arm is disposed between ground electrode 1144a and hot electrode 1146a. Similarly, the second interferometer 1120b has first interferometer arm disposed between ground electrode 1142b and hot electrode 1146b, while the second interferometer arm is disposed between ground electrode 1144b and hot electrode 1146b. Finally, the third interferometer 1120c has a first interferometer arm disposed between ground electrode 1142c and hot electrode 1146c, while the second interferometer arm is disposed between ground electrode 1144c and hot electrode 1146c. A single input terminal 1150 provides an input for the driving voltage, while a single output terminal 1152 provides an output for the remaining drive signal. A first high-pass filter and bias-tee network 1180a is provided between the first 1146a and second 1146b hot electrodes, while a second high-pass filter and bias-tee network 1180b is provided between the second 1146b and third 1146c hot electrodes. Preferably, each high-pass filter and bias tee network includes a high-pass filter for passing higher frequencies and rejecting lower ones and one or two bias-tees for injecting DC bias voltages into the RF circuit without affecting the flow of the RF. For example, FIG. 5b shows one example of a circuit suitable for serving as each high-pass filter and bias-tee network.

In operation, light is input into the modulator 1100 from the input port 1112 and is output through the output port 1114. More specifically, the light input through the input port 1112 propagates through the optical waveguide 1120 to the first interferometer 1120a. When a time varying voltage is applied to the electrode structure 1140 via terminal 1150, an electric field is produced that propagates down the first part of the traveling-wave electrode structure 1140, which is constructed to form a microwave waveguide. The electric field at least partially overlaps the two interferometer arms of the first interferometer 1120a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1120 to the first reflective surface 1160a where it is reflected to the second reflective surface 1160b and transmitted to the second interferometer 1120b. Simultaneously, the RF drive signal remaining at the end of the first part of the electrode structure 1140 is sent to the second part of the electrode structure after passing through the high pass filter 1180a. When the filtered RF drive signal is applied to the second part of the electrode structure 1140, an electric field is produced that propagates down the electrode structure, which is constructed to form a microwave waveguide. The electric field at least partially overlaps the two interferometer arms in the second interferometer 1120b. In accordance with the electro-optic effect, the electric field further impresses the synchronized modulated RF data signal onto the amplitude modulated optical signal. The strengthened amplitude modulated optical signal propagates through the optical waveguide 1120 to the third reflective surface 1160c where it is reflected to the fourth reflective surface 1160d and transmitted to the third interferometer 1120c. Simultaneously, the RF drive signal remaining at the end of the second part of the electrode structure 1140 is sent to the third part of the electrode structure after passing through the second high pass filter 1180b. When the filtered RF drive signal is applied to the third part of the electrode structure 1140, an electric field is produced that propagates down the electrode structure 1140, which is constructed to form a microwave waveguide. The electric field at least partially overlaps the two interferometer arms of the third interferometer 1120c. In accordance with the electro-optic effect, the electric field further impresses the synchronized modulated RF data signal onto the amplitude modulated optical signal to create an even stronger amplitude modulated optical signal, which is subsequently output through the output port 1114.

In addition to the advantages of the optical modulators discussed with reference to FIG. 10, the three stage optical modulator shown in FIG. 11 has the additional advantage that the reflective surfaces are integrated into the substrate.

Of course, the optical digital external modulator shown in FIG. 11 is described as above for exemplary purposes only. Alternatively, the optical modulator 1100 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, and/or to replace the traditional traveling wave electrode with another electrode structure such as a lumped or dual drive electrode. Optionally, a polarizer (not shown) is provided adjacent to the substrate near the input and/or output ports. Further optionally, a photo-detector (not shown) is mounted near one or more of the reflective surfaces to tap light to provide power monitoring and/or feedback for bias control.

Figure 12:
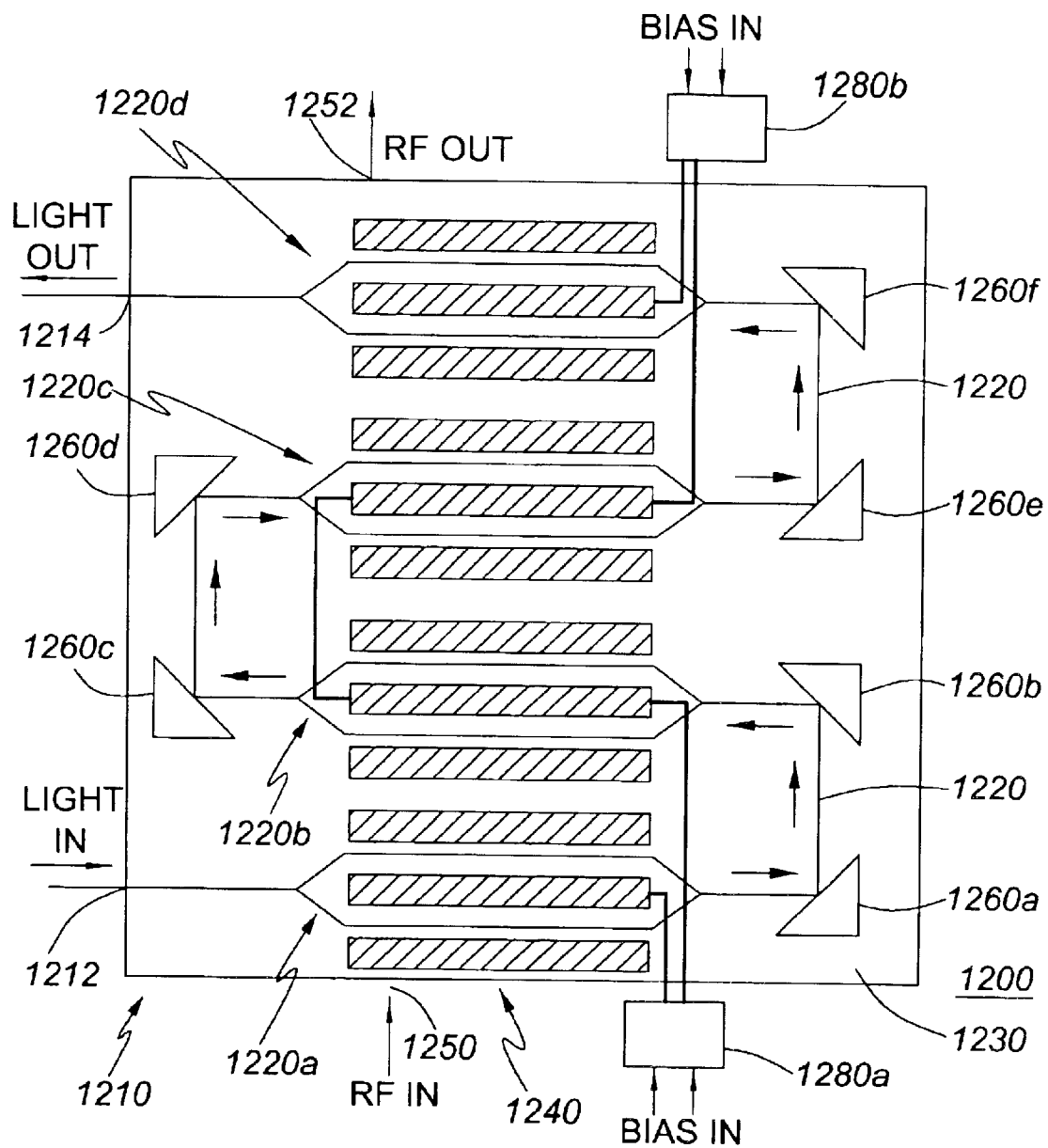
FIG. 12 is a schematic diagram of a four stage Mach-Zehnder optical modulator formed on a x-cut lithium niobate substrate and including integrated mirrors, the optical modulator has a series cascaded arrangement and biasing means in accordance with another embodiment of the instant invention.

Referring to FIG. 12, there is shown a schematic diagram of an optical digital external modulator 1200 in accordance with yet another embodiment of the instant invention that includes an optical waveguide 1220 formed in an x-cut lithium niobate ($LiNbO_3$) substrate 1230. The optical waveguide 1220 includes a first Mach-Zehnder interferometer 1220a, a second Mach-Zehnder interferometer 1220b, a third Mach-Zehnder interferometer 1220c, and a fourth Mach-Zehnder interferometer 1220d. Each interferometer includes a first Y-branch, a first interferometer arm, a second interferometer arm, and a second Y-branch. At the end of the substrate 1230 opposing the input/output end 1210, first 1260a and second 1260b reflective surfaces are provided to fold the optical path from the first interferometer 1220a to the second 1220b, while fifth 1260e and sixth 1260f reflective surfaces are provided to fold the optical path from the third interferometer 1020c to the fourth 1020d. At the input end 1210, third 1260c and fourth 1260d reflective surfaces are provided to fold the optical path from the second interferometer 1220b to the third 1220c. Preferably, the reflective surfaces are fabricated by etching a region of the substrate and metallizing the etched surfaces. Ideally, the etched surfaces are highly vertical with little tilt. A traveling-wave electrode structure 1240 is provided near the optical waveguide 1220. A single input terminal 1250 provides an input for the driving voltage, while a single output terminal 1252 provides an output for the remaining drive signal. A first high-pass filter and bias-tee network 1280a is provided in the electrical path connecting sections of the electrode structure positioned near the first and second interferometers, while a second high-pass filter and bias-tee network 1280b is provided in the electrical path connecting sections of the electrode structure positioned near the third 1220c and fourth 1220d interferometers. Preferably, each high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as each high-pass filter and bias-tee network.

In operation, light is input into the modulator 1200 from the input port 1212 and is output through the output port 1214. More specifically, the light input through the input port 1212 propagates through the optical waveguide 1220 such that it sequentially passes through the first interferometer 1220a, the second interferometer 1220b, the third interferometer 1220c, and the fourth interferometer 1220d. When a time varying voltage corresponding to a modulated RF data signal is launched into the electrode structure 1240 via terminal 1250, an electric field is produced. The electric field propagates through the electrode structure, which is constructed to form a continuous microwave waveguide, such that it also at least partially overlaps with each of the four interferometers before being output terminal 1252. At each stage of the optical modulator, the electric field impresses the modulation from the RF data signal onto the optical signal producing a relatively strong amplitude modulated optical signal, which is output through the output port 1214.

In addition to the advantages of the optical modulators discussed with reference to FIG. 5a, the four stage optical modulator shown in FIG. 12 has the advantage that the overall device length is approximately one-fourth the length of a conventional modulator. Furthermore, the optical modulator 1200 has the additional advantage that the reflective surfaces are integrated onto the substrate.

Of course, the optical digital external modulator shown in FIG. 12 is described as above for exemplary purposes only. Alternatively, the optical modulator 1200 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, and/or to replace the traditional traveling wave electrode with another electrode structure such as a lumped or dual drive electrode. Optionally, a polarizer (not shown) is provided adjacent to the substrate near the input and/or output ports. Further optionally, a photo-detector (not shown) is mounted near one or more of the reflective surfaces to tap light to provide power monitoring and/or feedback for bias control.

Figure 13:
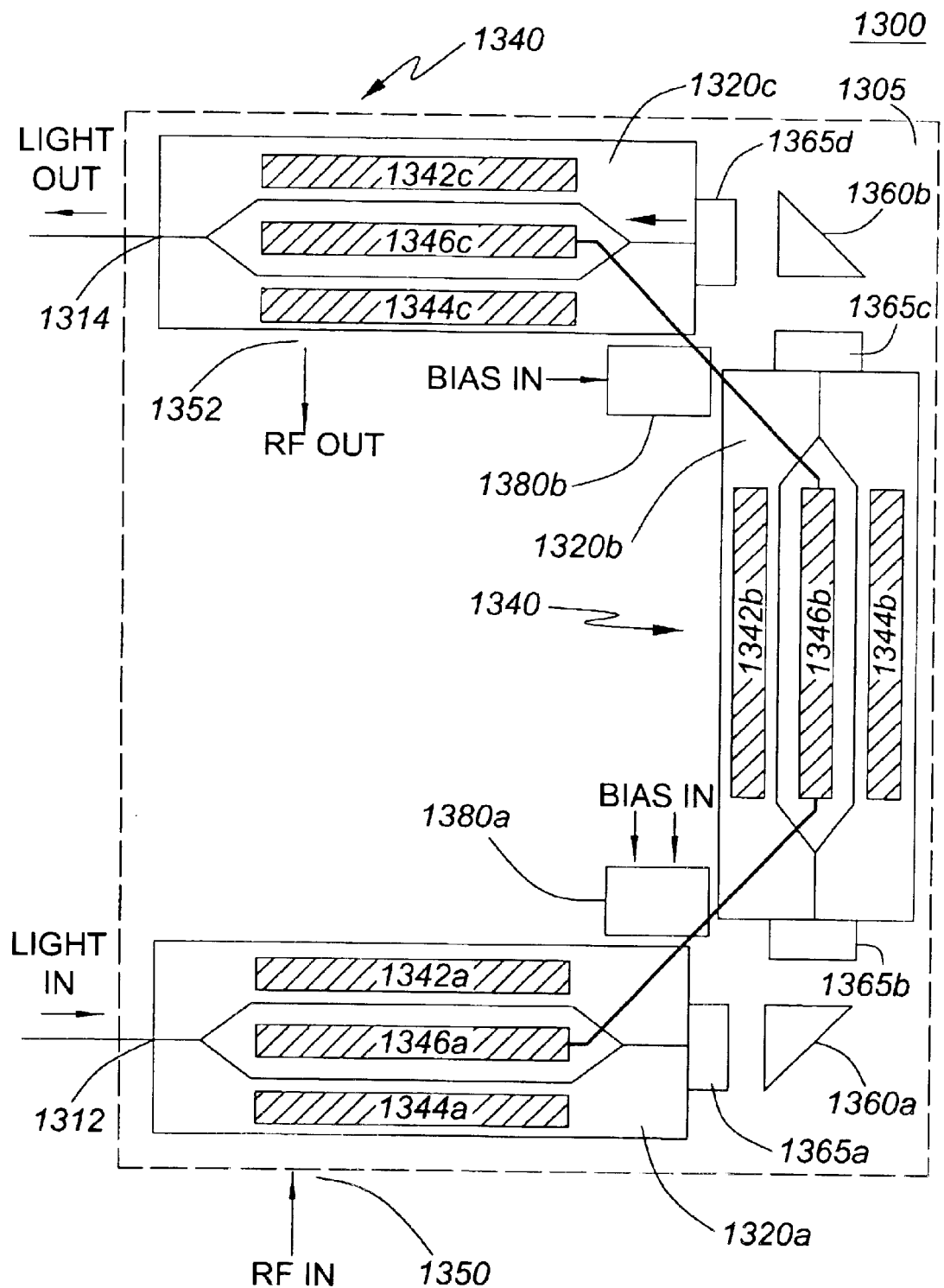
FIG. 13 is a schematic diagram of a three stage Mach-Zehnder optical modulator formed from three x-cut lithium niobate substrates, the optical modulator has a series cascaded arrangement and biasing means in accordance with another embodiment of the instant invention.

Referring to FIG. 13, there is shown a schematic diagram of an optical digital external modulator 1300 in accordance with another embodiment of the instant invention that includes a first Mach-Zehnder interferometer 1320a, a second Mach-Zehnder interferometer 1320b, and a third Mach-Zehnder interferometer 1320c, each of which is formed in a separate substrate or die. Electrode/waveguide orientation corresponding to x-cut lithium niobate is shown. Each die is mounted to a same tray 1305. Each interferometer includes a first Y-branch, a first interferometer arm, a second interferometer arm, and a second Y-branch. A first beam-folding prism 1360a, a first lens 1365a, and a second lens 1365b are provided to fold the optical path from the first interferometer 1320a to the second 1320b. A second beam-folding prism 1360b, third lens 1365c, and fourth lens 1365d are provided to fold the optical path from the second interferometer 1320b to the third 1320c. A traveling-wave electrode structure 1340 is coupled to each of the three interferometers such that in a first stage, the first interferometer 1320a has a first interferometer arm disposed between ground electrode 1342a and hot electrode 1346a, while the second interferometer arm is disposed between ground electrode 1344a and hot electrode 1346a. In the second stage, the second interferometer 1320b has first interferometer arm disposed between ground electrode 1342b and hot electrode 1346b, while the second interferometer arm is disposed between ground electrode 1344b and hot electrode 1346b. In the third stage, the third interferometer 1320c has a first interferometer arm disposed between ground electrode 1342c and hot electrode 1346c, while the second interferometer arm is disposed between ground electrode 1344c and hot electrode 1346c. A single input terminal 1350 provides an input for the driving voltage, while a single output terminal 1352 provides an output for the remaining drive signal. A first high-pass filter and bias-tee network 1380a is provided between the first 1346a and second 1346b hot electrodes, while a second high-pass filter and bias-tee network 1380b is provided between the second 1346b and third 1346c hot electrodes. Preferably, each high-pass filter and bias tee network includes a high-pass filter for passing higher frequencies and rejecting lower ones and one or two bias-tees for injecting DC bias voltages into the RF circuit without affecting the flow of the RF. For example, FIG. 5b shows one example of a circuit suitable for serving as each high-pass filter and bias-tee network. Advantageously, the electrical path between stages is shorter than the optical path between stages.

In operation, light is input into the modulator 1300 from the input port 1312 and is output through the output port 1314. More specifically, the light input through the input port 1312 propagates to the first interferometer 1320a. When a time varying voltage is applied to the electrode structure 1340 via terminal 1350, an electric field is produced that propagates down the first part of the traveling-wave electrode structure 1340, which is constructed to form a microwave waveguide. The electric field at least partially overlaps the two interferometer arms of the first interferometer 1320a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates to the first beam folding prism 1360a where it is redirected and transmitted to the second interferometer 1320b. Simultaneously, the RF drive signal remaining at the end of the first part of the electrode structure 1340 is sent to the second part of the electrode structure after passing through the high pass filter 1380a. When the filtered RF drive signal is applied to the second part of the electrode structure 1340, an electric field is produced that propagates down the electrode structure, which is constructed to form a microwave waveguide. The electric field at least partially overlaps the two interferometer arms in the second interferometer 1320b. In accordance with the electro-optic effect, the electric field further impresses the synchronized modulated RF data signal onto the amplitude modulated optical signal. The strengthened amplitude modulated optical signal propagates through the optical waveguide 1320 to the second beam-folding prism 1360b where it is redirected and transmitted to the third interferometer 1320c. Simultaneously, the RF drive signal remaining at the end of the second part of the electrode structure 1340 is sent to the third part of the electrode structure after passing through the second high pass filter 1380b. When the filtered RF drive signal is applied to the third part of the electrode structure 1340, an electric field is produced that propagates down the electrode structure 1340, which is constructed to form a microwave waveguide. The electric field at least partially overlaps the two interferometer arms of the third interferometer 1320c. In accordance with the electro-optic effect, the electric field further impresses the synchronized modulated RF data signal onto the amplitude modulated optical signal to create an even stronger amplitude modulated optical signal, which is subsequently output through the output port 1314.

Of course, the optical digital external modulator shown in FIG. 13 is described as above for exemplary purposes only. Alternatively, the optical modulator 1300 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace each lithium niobate substrate with another electro-optic substrate, such as a semiconductor (e.g., GaAs or InP), to provide an RF input terminal for each interferometer, to use a z- or y-cut electro-optic substrates, and/or to replace the traditional traveling wave electrode with another electrode structure such as a lumped or dual drive electrode. Optionally, a polarizer (not shown) is provided adjacent to the substrate near the input and/or output ports and/or between one of the substrates and a corresponding lens.

Figure 14:
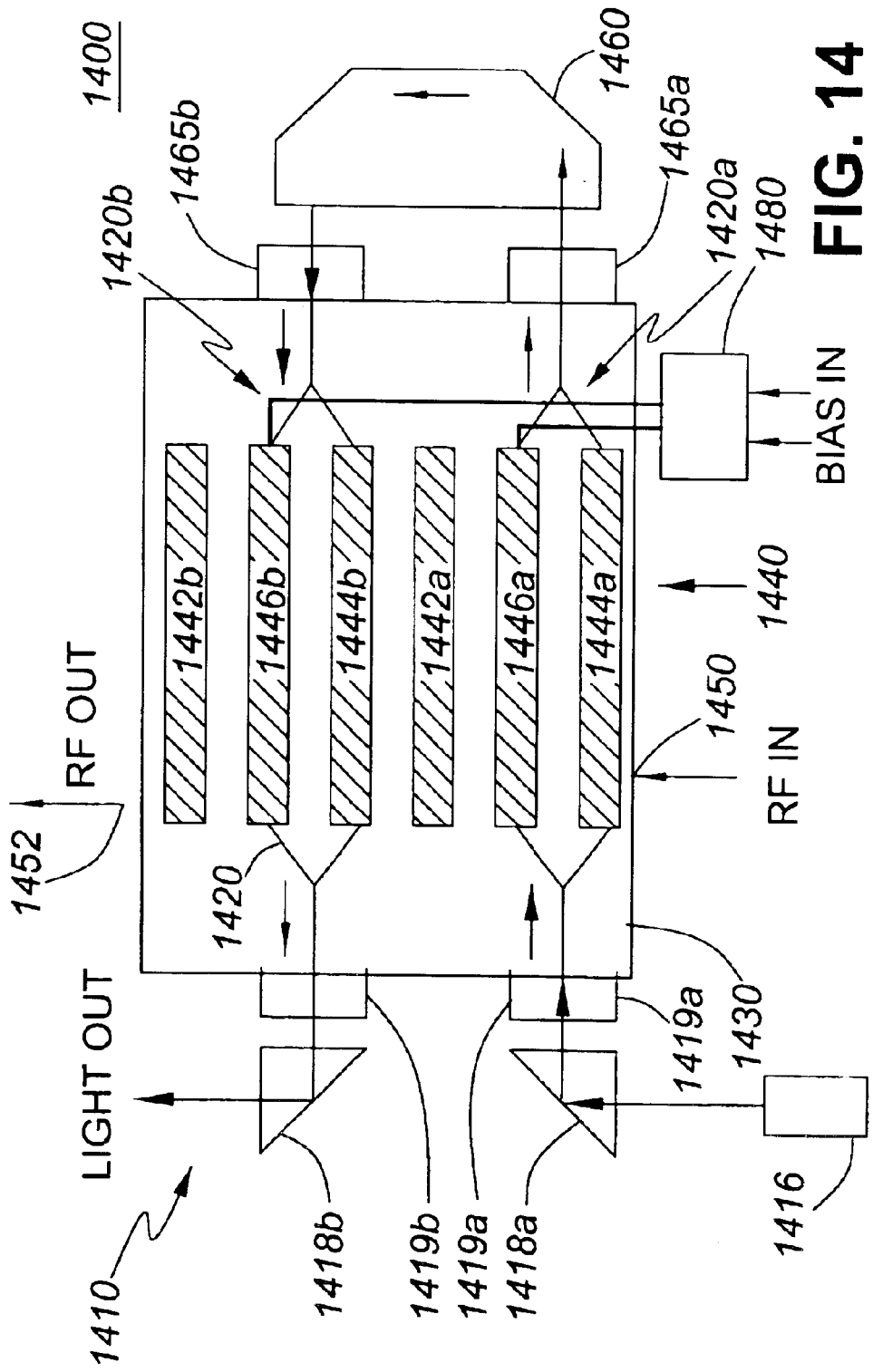
FIG. 14 is a schematic diagram of a dual stage Mach-Zehnder optical modulator formed on a z-cut lithium niobate substrate and integrated with a laser, the optical modulator has a series cascaded arrangement and biasing means in accordance with another embodiment of the instant invention.

Referring to FIG. 14, there is shown a schematic diagram of an optical digital external modulator 1400 in accordance with another embodiment of the instant invention that includes an optical waveguide 1420 formed in an z-cut lithium niobate (LiNbO$_3$) substrate 1430. The optical waveguide 1420 includes a first Mach-Zehnder interferometer 1420a and a second Mach-Zehnder interferometer 1420b. Each interferometer includes a first Y-branch, a first interferometer arm, a second interferometer arm, and a second Y-branch. At the input end of the substrate 1410 an optical source, which for exemplary purposes is shown as a laser 1416, provides a continuous-wave light signal. A first prism 1418a, first lens 1419a, second prism 1418b, and second lens 1419b are provided to couple light into and out of the optical waveguide 1420. At the end of the substrate 1430 opposing the input/output end 1410, a third prism 1460, a third lens 1465a, and a fourth lens 1465b are provided to fold the optical path from the first interferometer 1420a to the second 1420b. A traveling-wave electrode structure 1440 including ground electrodes 1442a, 1444a, 1442b, and 1444b and hot electrodes 1446a and 1446b is formed on the substrate 1430. A single input terminal 1450 provides an input for the driving voltages, while a single output terminal 1452 provides an output for the remaining drive signal. A high-pass filter and bias-tee network 1480 is provided between the first 1446a and second 1446b hot electrodes: Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light from the laser 1416 is redirected by prism 1418a to lens 1419a and is transmitted through the optical waveguide 1420 to the first interferometer 1420a, where it is split at the first Y-branch, and is transmitted equally along the two isolated paths corresponding to the two interferometer arms. When a time varying voltage is applied to the first part of the electrode structure 1440 via terminal 1450, an electric field is produced that propagates down the first part of the traveling-wave electrode structure 1440, which is constructed to form a microwave waveguide. The electric field at least partially overlaps the two interferometer arms. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1420 to the lens 1465a, prism 1460, and lens 1465b, where it is reflected and transmitted to the second interferometer 1420b. The light input into the second interferometer 1420b is split at the first Y-branch, where it then propagates equally along the two isolated paths corresponding to the two interferometer arms. Simultaneously, the RF drive signal remaining at the end of the first part of the electrode structure 1440 is sent to the second part of the electrode structure 1440 after passing through the high pass filter 1480. When the filtered RF drive signal is applied to the second part of the electrode structure 1440, an electric field is produced that propagates down the electrode structure 1440, which is constructed to form a microwave waveguide. The electric field at least partially overlaps the two interferometer arms. In accordance with the electro-optic effect, the electric field further impresses the synchronized modulated RF data signal onto the amplitude modulated optical signal. The modulated optical signal is transmitted through the lens 1419b, and is redirected by prism 1418b out of the optical modulator 1400.

Of course, the optical digital external modulator shown in FIG. 14 is described as above for exemplary purposes only. Alternatively, the optical modulator 1400 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided.

Figure 15:
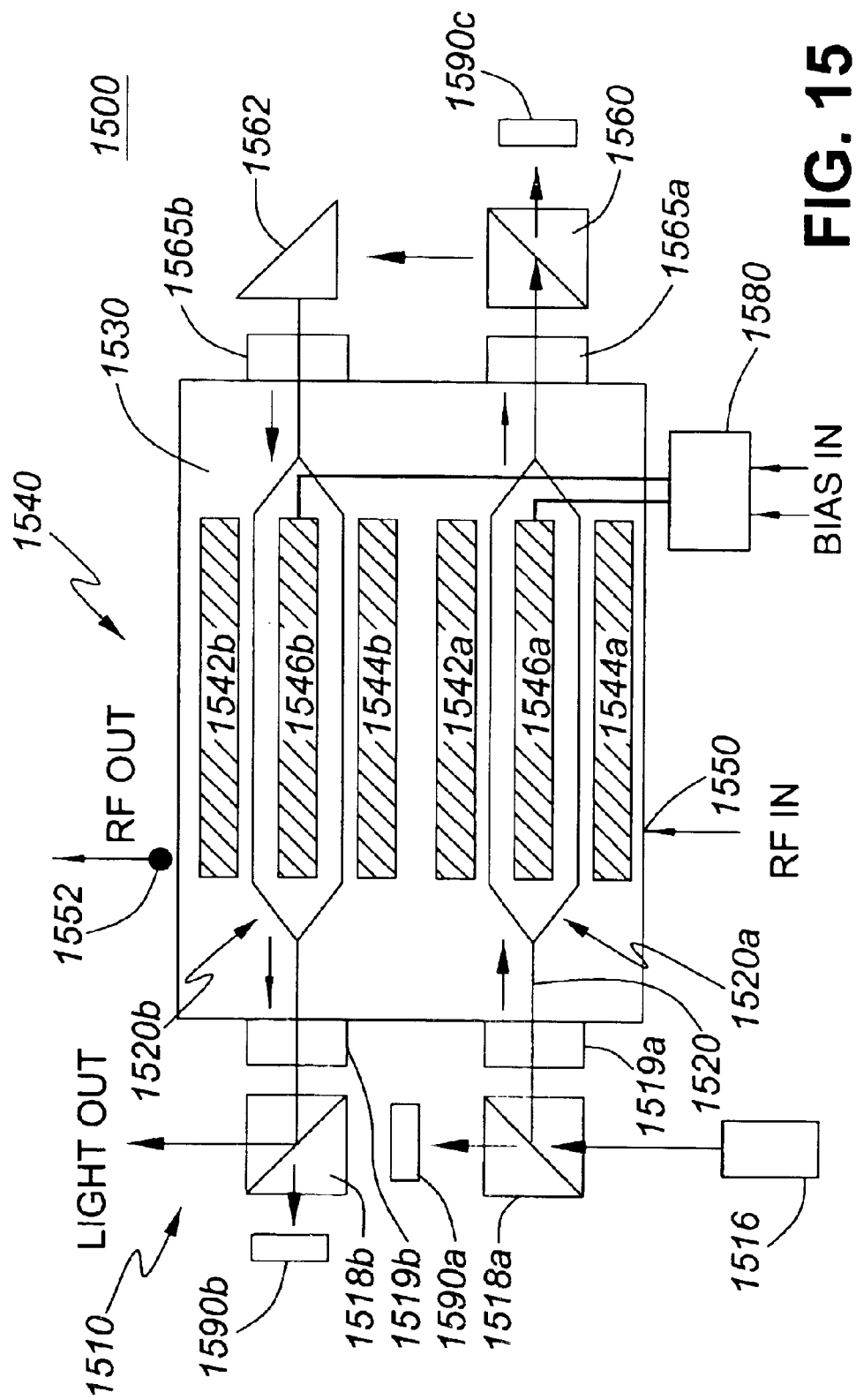
FIG. 15 is a schematic diagram of a dual stage Mach-Zehnder optical modulator formed on a z-cut lithium niobate substrate, integrated with a laser, and including a photodetector, the optical modulator has a series cascaded arrangement and biasing means in accordance with another embodiment of the instant invention.

Referring to FIG. 15, there is shown a schematic diagram of an optical digital external modulator 1500 in accordance with another embodiment of the instant invention that includes an optical waveguide 1520 formed in an z-cut lithium niobate (LiNbO$_3$) substrate 1530. The optical waveguide 1520 includes a first Mach-Zehnder interferometer 1520a and a second Mach-Zehnder interferometer 1520b. Each interferometer includes a first Y-branch, a first interferometer arm, a second interferometer arm, and a second Y-branch. At the input end of the substrate 1510 an optical source, which for exemplary purposes is shown as a laser 1516, provides a continuous beam of light. A first beam-splitter 1518a, first lens 1519a, second beam-splitter 1518b, and second lens 1519b are provided to couple light into and out of the optical waveguide 1520. At the end of the substrate 1530 opposing the input/output end 1510, a third lens 1565a, a third beam-splitter 1560, a prism 1562, and a fourth lens 1565b are provided to fold the optical path from the first interferometer 1520a to the second 1520b. Each of the first 1518a, second 1518b, and third beam-splitters 1560 is designed to tap a predetermined amount light and transmit it to a photo-detector 1590a, 1590b, and 1590c, respectively. A traveling-wave electrode structure 1540 including ground electrodes 1542a, 1544a, 1542b, and 1544b and hot electrodes 1546a and 1546b is formed on the substrate 1530 adjacent the first 1520a and second 1520b interferometers. A single input terminal 1550 provides an input for the driving voltages, while a single output terminal 1552 provides an output for the remaining drive signal. A high-pass filter and bias-tee network 1580 is provided between the first 1546a and second 1546b hot electrodes. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light from the laser 1516 is transmitted to the first beam-splitter 1518a. The first beam-splitter splits the light into a first sub-beam that is transmitted to the first photo-detector 1590a and a second sub-beam that is transmitted to the first lens 1519a. The second sub-beam of light is then transmitted through the optical waveguide 1520 to the first interferometer 1520a, where it is split at the first Y-branch, and is transmitted equally along the two isolated paths corresponding to the two interferometer arms of the first interferometer 1520a. When a time varying voltage is applied to the first part of the electrode structure 1540 via terminal 1550, an electric field is produced that propagates down the first part of the traveling-wave electrode structure 1540, which is constructed to form a microwave waveguide. The electric field at least partially overlaps the two interferometer arms. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1520 to the lens 1565a and beam-splitter 1560. The beam-splitter 1560 splits the light into a first sub-beam that is transmitted to the photo-detector 1590c and a second sub-beam that is transmitted to the prism 1562 and lens 1565b. The second sub-beam of light is input into the second interferometer 1520b, where it is split at the first Y-branch and propagates equally along the two isolated paths corresponding to the two interferometer arms of the second interferometer 1520b. Simultaneously, the RF drive signal remaining at the end of the first part of the electrode structure 1540 is sent to the second part of the electrode structure 1540 after passing through the high pass filter 1580. When the filtered RF drive signal is applied to the second part of the electrode structure 1540, an electric field is produced that propagates down the electrode structure 1540, which is constructed to form a microwave waveguide. The electric field at least partially overlaps the two interferometer arms of the second interferometer 1520b. In accordance with the electro-optic effect, the electric field further impresses the synchronized modulated RF data signal onto the amplitude modulated optical signal, which is subsequently transmitted to the second lens 1519b and beam-splitter 1518b. The beam-splitter 1518b splits the light into a first sub-beam that is transmitted to the second photo-detector 1590b and a second sub-beam that is output the optical modulator.

Advantageously, the tapped light is used to provide power monitoring and/or feedback for bias control.

Of course, the optical digital external modulator shown in FIG. 15 is described as above for exemplary purposes only. Alternatively, the optical modulator 1500 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided.

Figure 16:
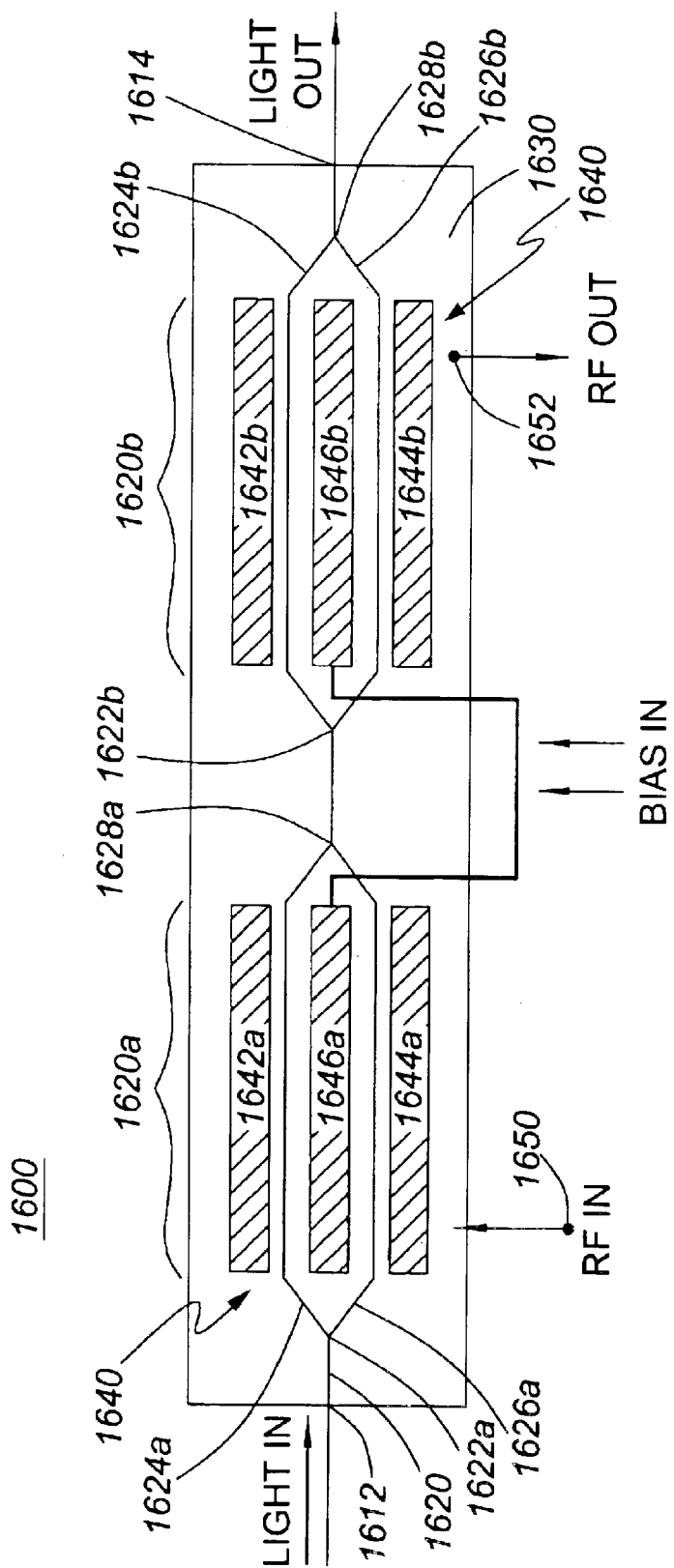
FIG. 16 is a schematic diagram of a dual stage Mach-Zehnder optical modulator formed on an x-cut lithium niobate substrate and having a series cascaded arrangement and biasing means in accordance with one embodiment of the instant invention.

Referring to FIG. 16, there is shown a schematic diagram of an optical digital external modulator 1600 in accordance with an embodiment of the instant invention that includes an optical waveguide 1620 formed in an x-cut lithium niobate (LiNbO$_3$) substrate 1630. The optical waveguide 1620 includes a first Mach-Zehnder interferometer 1620a connected to a second Mach-Zehnder interferometer 1620b in series. The first interferometer 1620a includes a first Y-branch 1622a, a first interferometer arm 1624a, a second interferometer arm 1626a, and a second Y-branch 1628a. The second interferometer 1620b includes a first Y-branch 1622b, a first interferometer arm 1624b, a second interferometer arm 1626b, and a second Y-branch 1628b. The first 1620a and second 1620b interferometers have a cascaded arrangement. A traveling-wave electrode structure 1640 is provided near the optical waveguide 1620 such that the first interferometer arm 1624a is disposed between ground electrode 1642a and hot electrode 1646a, while the second interferometer arm 1626a is disposed between ground electrode 1644a and hot electrode 1646a. Similarly, the first interferometer arm 1624b is disposed between ground electrode 1642b and hot electrode 1646b, while the second interferometer arm 1626b is disposed between ground electrode 1644b and hot electrode 1646b. A single input terminal 1650 provides an input for the RF drive signal that passes through both interferometers, while a single output terminal 1652 provides an output for the remaining RF drive signal. A high-pass filter and bias tee network (not shown) includes a high-pass filter for passing higher frequencies and rejecting lower ones and includes bias-tees for injecting DC bias voltages into the RF circuit without affecting the flow of the RF.

In operation, light is input into the modulator 1600 from the input port 1612 and is output through the output port 1614. More specifically, the light input through the input port 1612 propagates through the optical waveguide 1620 to the first interferometer 1620a, where it is split at the first Y-branch 1622a, and is transmitted equally along the two isolated paths corresponding to the two interferometer arms 1624a, 1626a. When a time varying voltage is applied to the electrode structure 1640 via terminal 1650, an electric field is produced that propagates down the traveling-wave electrode structure 1640, which is constructed to form a microwave waveguide. The electric field at least partially overlaps the two interferometer arms 1624a and 1626a. In accordance with the electro-optic effect, the electric field causes the relative velocity of the light propagating through the two interferometer arms 1624a, 1626a to change, thus creating a phase shift and producing constructive or destructive interference at the second Y-branch 1628a. The constructive and/or destructive interference produces an amplitude modulated optical signal, wherein the modulation corresponds to a modulated RF data signal used to produce the time varying voltage. The amplitude modulated optical signal propagates through the optical waveguide 1620 to the second interferometer 1620b. The light input into the second interferometer 1620b is split at the first Y-branch 1622b, where it then propagates equally along the two isolated paths corresponding to the two interferometer arms 1624b, 1626b. Simultaneously, the RF drive signal remaining at the end of the first interferometer 1620a passes through a high-pass filter and bias-tee network (not shown) before being sent to the second interferometer 1620b, such that the corresponding electric field also at least partially overlaps the two interferometer arms 1624b and 1626b. In accordance with the electro-optic effect, the electric field further impresses the synchronized modulated RF data signal onto the amplitude modulated optical signal, which is subsequently output through the output port 1614.

An advantage of the optical modulator shown in FIG. 16 is that it has a cascaded arrangement where the optical modulator 1600 is broken into two interferometers, namely, a first interferometer 1620a and a second interferometer 1620b. This cascaded arrangement allows the optical modulator 1600 to be optimized for digital signal transmission. For example, as with the optical modulator 500 shown in FIG. 5a, driving the optical modulator 1600 with an RF data signal and selecting the appropriate bias points provides an optical external digital modulator with improved performance for digital signal transmission.

Figure 17A:
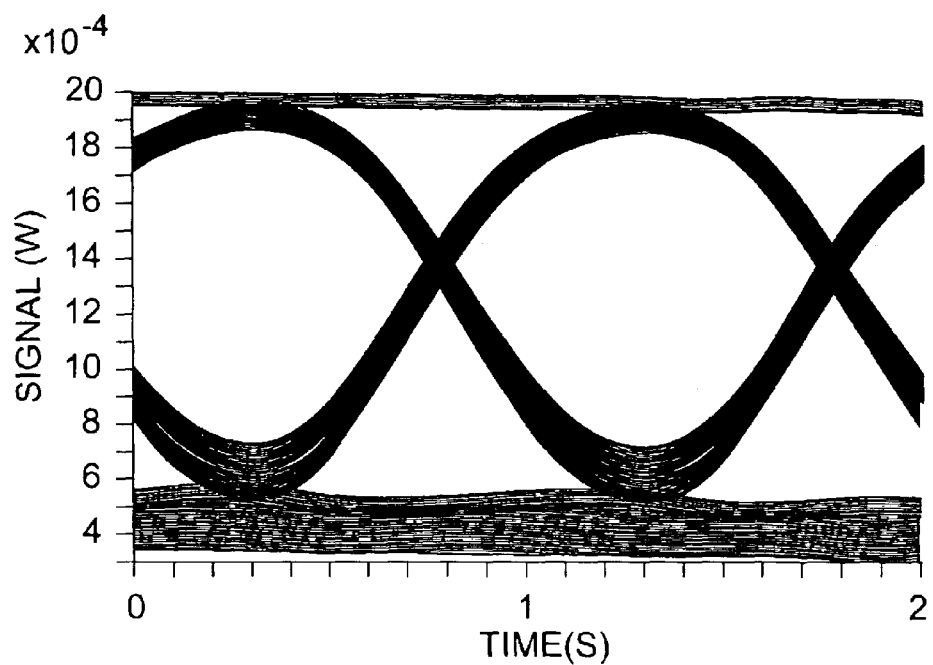
FIG. 17a is a simulated eye diagram of an optical signal after passing through the first stage of the optical modulator shown in FIG. 17, when both interferometers are biased 25° from quadrature.
Figure 17B:
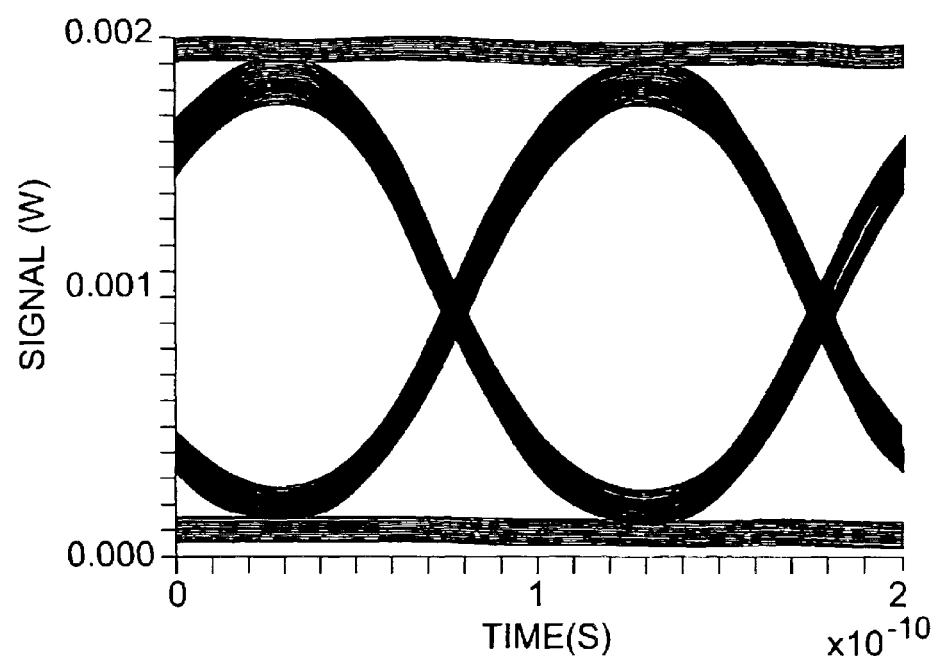
FIG. 17b is a simulated eye diagram of an optical signal after passing through both the first and second stages of the optical modulator shown in FIG. 17, when both interferometers are biased 25° from quadrature.

Referring to FIGS. 17a and 17b, there is shown simulated eye diagrams after each stage of the optical modulator 1600, when both interferometers are biased at 65°. More specifically, FIG. 17a shows a digital eye diagram after the optical signal has passed through the first interferometer 1620a, while FIG. 17b shows a digital eye diagram after the optical signal has passed through both the first interferometer 1620a and the second interferometer 1620b. Notably, providing a bias point 25° from quadrature for the first stage of the optical modulator results in an eye-crossing level that is above the 50% level. However, after passing through the second stage of the optical modulator, the symmetry to the eye diagram is restored. Each simulation includes velocity matching and a bias point of 65° for each interferometer, and neglects the effects of RF electrode loss. The electrical signal bandwidth is limited to 5 GHz.

Of course, the optical digital external modulator shown in FIG. 16 is described as above for exemplary purposes only. Alternatively, the optical modulator 1600 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided. Further optionally, a DOC (not shown) is mounted on the substrate for tapping light to provide power monitoring and/or feedback for bias control. To reduce the length of the cascaded modulator shown in FIG. 16, an electro-absorption (EA) modulator (not shown) is optionally provided in each of the four interferometer arms.

In each of the embodiments shown in FIGS. 5a and 6–16, the optical modulator is typically biased for a very slight insertion loss at the on-state (e.g., less than 1 dB). Preferably, each optical modulator is biased to produce a digital eye diagram that has an eye crossing level at approximately 50% transmission. Since each optical modulator includes one or more interferometers, this means that each interferometer in the cascade will be biased off, and in particular above, quadrature.

As discussed with reference to FIG. 5a, one embodiment involves biasing both interferometers of a two-stage interferometer 25° from quadrature, or at 65°, where 90° is the phase at quadrature and 0° is the phase for the interferometers being full-on. According to another embodiment, each of the two interferometers of a two-stage optical modulator is operated at a different bias point (e.g., the first interferometer 20° from quadrature and the second interferometer 30° from quadrature, or alternatively, the first interferometer 35° from quadrature and the second interferometer 15° from quadrature). According to yet another embodiment, each of the four interferometers of a four-stage optical modulator is biased at 47°. According to yet another embodiment, the first, second, third and fourth interferometers of a four-stage optical modulator are biased at 41.5°, 46.5°, 47.5°, and 51.5°, respectively. Other appropriate bias points can be calculated and/or selected by those skilled in the art.

In each instance, the net intensity after passing through the cascade of interferometers is approximately at the half-power point, when no RF drive signal is applied. In a conventional optical modulator, this corresponds to the single interferometer being set to the 50% transmission point (i.e., the quadrature point). In a cascaded modulator, the net intensity becomes the product of the transmission of each interferometer in the cascade. Thus, depending if there are two, three, or four interferometers, the transmission of each interferometer will be about 71%, 80%, and 84%, respectively.

Optimizing an optical modulator by selecting the bias points of each interferometer in the cascade so that the digital eye diagram has an eye-crossing about the half power level advantageously provides a linearization that improves transmission performance for digital data signals over an optical fiber (e.g., where the digital data signal is not simply a train of equally spaced identical pulses). For example, transmission performance would be affected when transitions between the on and off states of a two-level digital data signal are distorted by dispersion of the optical fiber. The linearization discussed above minimizes the degradation of the digital optical signal due to optical fiber dispersion.

Notably, the advantages of providing linearity for optical digital external modulators, and in particular, for optical digital external modulators used for two-level digital data signals, has not been recognized in the prior art. Presumably, this is because one skilled in the art might have expected greater signal distortion when driving a cascaded modulator from full-on to full-off. Furthermore, the insertion loss with no digital signal applied would be 3 dB higher than for a single modulator, assuming both interferometers were biased at the conventional quadrature.

In each of the above cascaded optical modulator embodiments, the traditional Mach-Zehnder interferometer is optionally i replaced with another interferometer. For example, according to one embodiment the cascaded interferometers are nested Mach-Zehnder interferometers.

Figure 18:
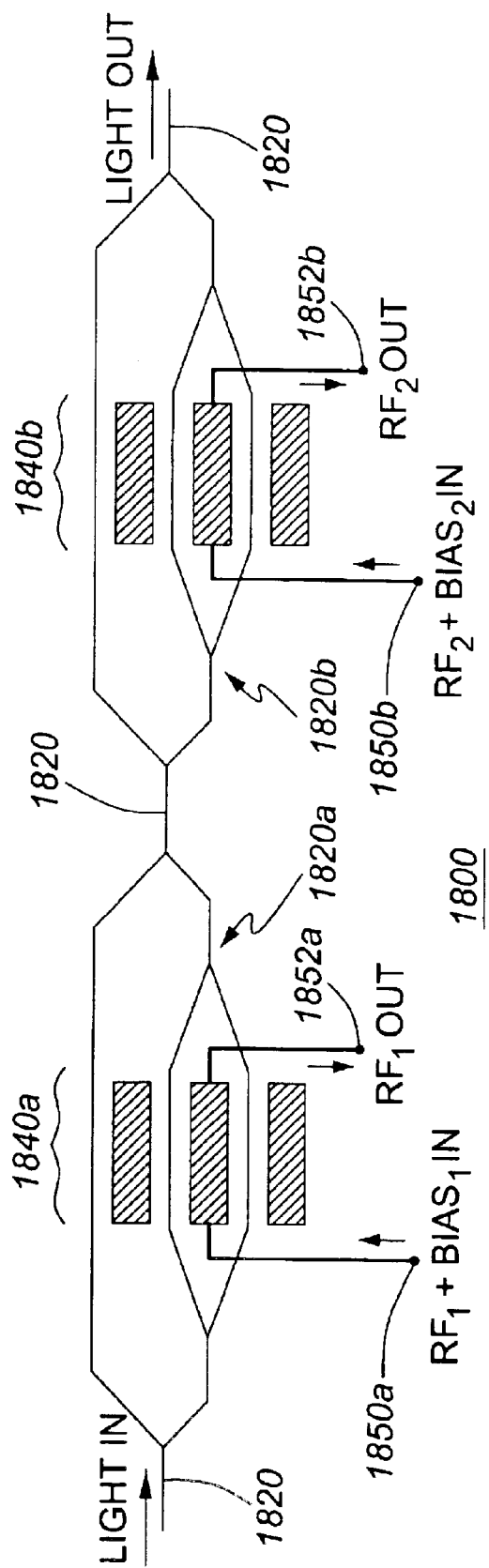
FIG. 18 is a schematic diagram of a dual stage nested Mach-Zehnder optical modulator formed on an x-cut lithium niobate substrate, the optical modulator has a series cascaded arrangement and biasing means in accordance with one embodiment of the instant invention.

Referring to FIG. 18, there is shown a schematic diagram of an optical digital external modulator 1800 in accordance with an embodiment of the instant invention. Electrode/waveguide orientation corresponding to x-cut lithium niobate is shown. The optical modulator 1800 includes an optical waveguide 1820 forming a first Mach-Zehnder interferometer 1820*a* that is cascaded with a second Mach-Zehnder interferometer 1820*b*. Each Mach-Zehnder interferometer 1820*a* and 1820*b* is a nested Mach-Zehnder having three arms. A traveling-wave electrode structure 1840*a*/1840*b* is coupled to the first 1820*a* and second 1820*b* interferometers. The traveling electrode structure includes a first traveling-wave electrode 1840*a* for modulating two of the three optical paths of the first interferometer 1820*a* and a second traveling-wave electrode 1840*b* for modulating two of the three optical paths of the second interferometer 1820*b*. Each traveling electrode 1840*a* and 1840*b* includes two ground electrodes and a central hot electrode. A single input terminal 1850*a* provides an input for the RF drive signal for the first nested interferometer 1820*a*, while a single output terminal 1852*a* provides an output for the remaining RF drive signal from the first nested interferometer. Similarly, a single input terminal 1850*b* provides an input for the RF drive signal for the second nested interferometer 1820*b*, while a single output terminal 1852*b* provides an output for the remaining RF drive signal from the second nested interferometer. Nominally, all y-junctions divide and combine optical power equally. For example, the third upper arm of each nested interferometer nominally carries twice as much optical power as either of the lower arms that are modulated.

In operation, light input into the modulator 1800 propagates through the optical waveguide 1820 to the first interferometer 1820*a*. When a time varying voltage is applied to the electrode 1840*a* via terminal 1850*a*, an electric field is produced that modulates the optical path of two arms of the three arm interferometer 1820*a* and produces an amplitude modulated optical signal. The amplitude modulated optical signal propagates through the optical waveguide 1820 to the second interferometer 1820*b*. When a time varying voltage is applied to the electrode 1840*b* via terminal 1850*b*, another electric field is produced that modulates the optical path of two arms of the three arm interferometer 1820*b*. The modulation from the second stage strengthens the modulation from the first stage, to produce a relatively strong modulated optical signal. Preferably, each interferometer in the optical modulator 1800 is driven with a time varying voltage that corresponds to an RF data signal and is operated at a bias point selected to provide a symmetric digital eye diagram.

Of course, the optical digital external modulator shown in FIG. 18 is described as above for exemplary purposes only. Alternatively, the optical modulator 1800 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), and/or to replace the traditional traveling wave electrode with another electrode structure such as a lumped or dual drive electrode. Optionally, a polarizer or polarizing optics (not shown) are provided. Further optionally, a DOC (not shown) is mounted on the substrate for tapping light to provide power monitoring and/or feedback for bias control. Further optionally, the two RF drive signals are provided by a single RF source, which is split into two sub-signals.

In the optical modulator 1800 shown in FIG. 18, each stage of the two-stage modulator is driven in parallel. It is also possible for the optical modulator 1800 to be driven in series as described with respect to FIGS. 5*a* and 6–16. Since a single RF drive signal is applied to each stage of the multi-stage optical modulator 1800, in series, drive power is advantageously conserved.

For example, according to one embodiment, the RF signal from terminal 1852*a* passes through a high-pass filter and bias-tee network (not shown) before being sent to terminal 1850*b*. Preferably, the high-pass filter and bias tee network includes a high-pass filter for passing higher frequencies and rejecting lower ones and includes bias-tees for injecting DC bias voltages into the RF circuit without affecting the flow of the RF.

The embodiments of the invention described above are intended to be exemplary only. The scope of the invention is therefore intended to be limited solely by the scope of the appended claims.

What is claimed is:

1. An optical digital external modulator comprising:
 a plurality of interferometers having a cascaded arrangement;
 an electrode structure disposed for applying an electric field to each interferometer in the plurality of interferometers in response to an RF drive signal applied to the electrode structure; and,
 biasing circuitry coupled to the electrode structure for biasing each interferometer in the plurality of interferometers at a predetermined bias point, the predetermined bias point for each interferometer selected such that the optical modulator is optimized for transmitting a digital data signal through an optical fiber.

2. An optical digital external modulator according to claim 1, comprising a reflector disposed for redirecting light output from a first interferometer in the plurality of interferometers to an input of a second interferometer in the plurality of interferometers, the first and second interferometers being spatially separated.

3. An optical digital external modulator according to claim 2, wherein the reflector comprises at least one lens and a reflective surface.

4. An optical digital external modulator according to claim 2, wherein the reflective surface comprises a prism.

5. An optical digital external modulator according to claim 2, wherein the reflector comprises a reflective directional coupler.

6. An optical digital external modulator according to claim 2, wherein the reflector comprises an integrated mirror system.

7. An optical digital external modulator according to claim 2, wherein the reflector comprises a MEMS mirror.

8. An optical digital external modulator according to claim 2, comprising a second reflector, the second reflector disposed for redirecting light from the second interferometer in the plurality of interferometers to a third interferometer in the plurality of interferometers, the second and third interferometers being spatially separated.

9. An optical digital external modulator according to claim 8, comprising a third reflector, the third reflector disposed for redirecting light from the third interferometer in the plurality of interferometers to a fourth interferometer in the plurality of interferometers, the third and fourth interferometers being spatially separated.

10. An optical digital external modulator according to claim 2, wherein the electrode structure comprises a first traveling-wave electrode disposed for applying an electric field to the first interferometer and a second traveling-wave electrode disposed for applying an electric field to the second interferometer, the first and second traveling-wave electrodes coupled via a first electrical path.

11. An optical digital external modulator according to claim 10, comprising an optical-waveguide coupling the first and second interferometers, the optical waveguide having a path length that is longer than the path length of the first electrical path.

12. An optical digital external modulator according to claim 11, wherein the electrode structure is designed such that the applied electric fields travel slower than an optical signal propagating through the plurality of interferometers.

13. An optical digital external modulator according to claim 10, comprising a first high-pass filter disposed in the first electrical path.

14. An optical digital external modulator according to claim 13, wherein the biasing circuitry comprises first and second bias-tee circuits integrated with the first high-pass filter, the first bias-tee circuit including a first input terminal for providing a first bias voltage to the first interferometer and the second bias-tee circuit including a second input terminal for providing a second bias voltage to the second interferometer.

15. An optical digital external modulator according to claim 14, wherein the electrode structure further comprises a third traveling-wave electrode disposed for applying an electric field to a third interferometer, the second and third traveling-wave electrodes coupled via a second electrical path.

16. An optical digital external modulator according to claim 15, comprising a second high-pass filter disposed in the second electrical path, and wherein the biasing circuitry further comprises a third bias-tee circuit integrated with the second high-pass filter, the third bias-tee circuit including a third input terminal for providing a third bias voltage to the third interferometer.

17. An optical digital external modulator according to claim 10, wherein each of the first and second traveling-wave electrodes comprises a first ground electrode, a second ground electrode, and a hot electrode.

18. An optical digital external modulator according to claim 10, comprising a single RF input terminal and a single RF output terminal, each RF terminal coupled to the electrode structure and disposed such that an RF drive signal input through the RF input terminal is applied to the first traveling-wave electrode and then to the second traveling-wave electrode before being output through the RF output terminal.

19. An optical digital external modulator according to claim 2, wherein each predetermined bias point is selected to be above quadrature such that a digital transmission eye crossing level is approximately 50%.

20. An optical digital external modulator according to claim 1, wherein the plurality of interferometers comprises a plurality of Mach-Zehnder interferometers.

21. An optical digital external modulator according to claim 1, wherein the plurality of interferometers is formed in a same electro-optic substrate.

22. An optical digital external modulator according to claim 1, further comprising a detector coupled to the plurality of interferometers.

23. An optical digital external modulator according to claim 1, further comprising a light source coupled to the plurality of interferometers for providing continuous-wave light.

24. An optical digital external modulator according to claim 1, wherein each predetermined bias point is selected to be above quadrature such that a digital transmission eye crossing level is approximately 50%.

25. An optical digital external modulator according to claim 1, wherein the plurality of interferometers comprises a first interferometer coupled with a second interferometer in series such that an optical input of the second interferometer is coupled to an optical output of the first interferometer, the first interferometer being laterally displaced relative to the second interferometer.

26. An optical digital external modulator comprising:
an electro-optic substrate;
a plurality of interferometers formed in the electro-optic substrate, the plurality of interferometers including a first interferometer cascaded with a second interferometer such that an input port of the second interferometer is coupled to an output port of the first interferometer;
a reflector optically disposed between the first and second interferometers, the reflector for redirecting light from the first interferometer to the second interferometer;
an electrode structure disposed on the electro-optic substrate, the electrode structure for transmitting an electric field at least partially through each of the first and second interferometers; and,
biasing circuitry coupled to the electrode structure, the biasing circuitry for biasing the first interferometer at a first predetermined bias point and the second interferometer at a second predetermined bias point, both of the first and second predetermined bias points selected such that the optical modulator is optimized for transmitting a digital data signal through an optical fiber.

27. An optical digital external modulator according to claim 26, further comprising an RF input terminal and an RF output terminal, each terminal coupled to the electrode structure and arranged such that the modulator is, in use, driven in series.

28. An optical digital external modulator according to claim 26, wherein each of the first and second predetermined bias points is above quadrature.

29. A method of modulating an optical signal comprising:
providing an optical digital external modulator, the modulator including a plurality of interferometers having a cascaded arrangement, an electrode structure disposed for applying electric fields to each interferometer in the plurality of interferometers, and biasing circuitry coupled to the electrode structure;
supplying the optical signal to the plurality of interferometers;
applying an RF drive signal to the electrode structure; and,
biasing each interferometer in the plurality of interferometers at a predetermined bias point, each predetermined bias point selected such that the optical modulator is optimized for transmitting a digital data signal through an optical fiber.

30. A method according to claim 29, wherein each predetermined bias point is selected to be substantially above quadrature.

31. A method according to claim 30, wherein each predetermined bias point is selected such that the modulator provides a digital eye diagram with an eye crossing level of about 50%.

32. A method according to claim 31, wherein each predetermined bias point is about 65°.

33. A method according to claim 32, further comprising under-driving the modulator.

34. A method according to claim 29, further comprising under-driving the modulator.

35. A method according to claim 29, further comprising driving the modulator in series.

36. A method according to claim 29, wherein applying the RF drive signal to the electrode structure comprises passing the RF drive signal through a high-pass filter disposed between two successive interferometers in the plurality of interferometers.

* * * * *